United States Patent
Silvestri et al.

(10) Patent No.: US 11,739,838 B2
(45) Date of Patent: Aug. 29, 2023

(54) PARK LOCK WITH DOG CLUTCH AND BALL RAMP

(71) Applicant: DANA GRAZIANO S.R.L., Rivoli (IT)

(72) Inventors: Marco Silvestri, Rivoli (IT); Giorgio Scalici, Rivoli (IT)

(73) Assignee: DANA GRAZIANO S.R.L., Rivoli (IT)

( * ) Notice: Subject to any disclaimer, the term of this patent is extended or adjusted under 35 U.S.C. 154(b) by 73 days.

(21) Appl. No.: 17/337,309

(22) Filed: Jun. 2, 2021

(65) Prior Publication Data

US 2022/0390012 A1 Dec. 8, 2022

(51) Int. Cl.
*F16H 63/34* (2006.01)
*F16H 63/38* (2006.01)

(52) U.S. Cl.
CPC ..... *F16H 63/3425* (2013.01); *F16H 63/3441* (2013.01); *F16H 63/3466* (2013.01); *F16H 63/38* (2013.01)

(58) Field of Classification Search
CPC ............. F16H 63/3425; F16H 63/3441; F16H 63/3466; F16H 63/38; F16H 2048/346
See application file for complete search history.

(56) References Cited

U.S. PATENT DOCUMENTS

| | | |
|---|---|---|
| 4,696,164 A | 9/1987 | Giere |
| 5,802,915 A | 9/1998 | Organek et al. |
| 6,645,109 B2 | 11/2003 | Williams et al. |
| 2004/0188212 A1 | 9/2004 | Weilant |
| 2006/0065070 A1 | 3/2006 | Puiu |
| 2015/0107955 A1 | 4/2015 | Trönnberg |
| 2016/0097443 A1* | 4/2016 | Larsson ................. F16H 48/34 |
| | | 475/150 |
| 2018/0106301 A1* | 4/2018 | Moubarak ............... F16D 21/06 |
| 2018/0326844 A1 | 11/2018 | Ekonen et al. |
| 2020/0248796 A1* | 8/2020 | Weigelt ................... F16H 63/36 |

FOREIGN PATENT DOCUMENTS

WO 2019145465 A1 8/2019

\* cited by examiner

*Primary Examiner* — Lori Wu
(74) *Attorney, Agent, or Firm* — McCoy Russell LLP

(57) ABSTRACT

Methods and systems are provided for a vehicle park lock. In one example, the park lock may be configured with a first portion having a first set of teeth and a second portion having a second set of teeth configured to engage with the first set of teeth. The first portion may be coupled to a rotating part of the vehicle while the second portion may be coupled to a stationary part of the vehicle. The second portion may include actuating devices to actuate the sliding of the second set of teeth, the actuating devices including a motion source, elastic elements, and one or more ramps.

20 Claims, 18 Drawing Sheets

PARK LOCK WITH DOG CLUTCH AND BALL RAMP

TECHNICAL FIELD

The present description relates generally to methods and systems for a vehicle park lock.

BACKGROUND AND SUMMARY

A conventional vehicle park lock, also known as a parking pawl, inhibits vehicle motion when a vehicle is adjusted to a park mode by locking a transmission output shaft to a transmission casing. When the parking pawl is activated, the pawl engages a notched wheel directly or indirectly coupled to the transmission output shaft, thereby impeding rotation of the output shaft and drive wheels of the vehicle. When a torque demand, e.g., an amount of torque required to oppose rotation of the output shaft at the output shaft is high, the pawl may not be sufficient to stop vehicle motion. For example, if a vehicle is parked on an incline, the torque applied to the vehicle drive wheels and hence, the output shaft, to resist downslope rolling of the vehicle may exceed a capability of the pawl to hold the notched wheel stationary. Furthermore, over time, repeated use of the pawl in high torque applications may lead to degradation of the pawl. To increase the park lock's ability to meet torque demands, a larger pawl and/or a larger notched wheel at the transmission output shaft may be used.

However, the inventors herein have recognized potential issues with such systems. As one example, a larger pawl and/or a larger notched wheel may increase the size and weight of the vehicle transmission. Furthermore, the larger pawl may demand an actuator with a large footprint and increased power demands to effectively inhibit vehicle motion. Additionally, the pawl may have a tendency to slip or miss the notched wheel, which may result in delayed locking of the output shaft or compromised ability to stop the vehicle.

Other attempts to address a need for a park lock that can withstand high torque demands and reduce or prevent slip include implementing a dog clutch in place of the one-tooth pawl. The dog clutch couples two gears with frontal teeth by clearance fit, rather than by friction, similar to the conventional park lock. The two gears of the dog clutch with frontal teeth may be analogous to the previously described notched wheel and the pawl. The two gears of the dog clutch push against each other, locking the components, and locking elements attached thereto.

One example approach is shown by Trönnberg et al. in U.S. 2015/0107955. Therein, a first and a second clutch dog are configured to disengage from each other when rotary power is transmitted between the first and the second clutch dogs. An actuator assembly is configured to lock when the second clutch dog is engaged to the first clutch dog to inhibit automatic disengagement of the second clutch dog from the first clutch dog. The actuator assembly is configured with an output member that slides the second clutch dog between a first position, in which the second clutch dog is engaged to the first clutch dog, and a second position in which the second clutch dog is spaced apart from the first clutch dog so that rotary power cannot be transmitted between the first and second clutch dogs. Therefore, if applied as a park lock, the dog clutch configuration would lock the transmission when the first and the second clutch dogs are engaged.

However, the aforementioned two clutch dog system configuration may include a demanding actuation system. For example, the two clutch dog system may rely on the actuator assembly to directly control axial sliding of one the first and the second clutch dogs in order to engage the dogs via the output member. During instances when high torque is applied to the output shaft during adjustment of a vehicle to a parked mode, a high power output of the actuator assembly is required.

In one example, the issues described above may be addressed by a park lock for a vehicle comprising a first portion coupled to a rotating part of a wheel assembly of the vehicle, the first portion having a first set of teeth, and a second portion anchored to a stationary part of the vehicle and having a second set of teeth configured to engage with the first set of teeth. The second set of teeth of the second portion is coupled to a sliding set of components and the second portion further includes actuating devices to actuate a sliding of the second set of teeth, the actuating devices including a motion source, elastic elements, and one or more ramps. In this way, the park lock may be configured with elements that allow park lock engagement/disengagement, a reduced footprint compared to conventional park locks, and reduced energy requirements for actuation. Additionally, the park lock is stabilized by a geometry and configuration of the various components in addition to actuator stabilization.

As one example, when the vehicle is shifted to a park mode, the first set of teeth of the first portion may mesh with the second set of teeth of the second portion. While engagement of the first set of teeth with the second set of teeth is initiated by an actuator (e.g., a motor), the actuator does not directly counteract forces applied to an output shaft of the vehicle transmission. Instead, the park lock utilizes a ball ramp system (which includes the plurality of balls) and a plurality of springs to convert rotational motion provided by the actuator into axial motion at the second portion of the park lock. In one embodiment, the rotating part of the vehicle may be a differential casing and the stationary part of the vehicle may be an axle housing. In this way, the park lock may be coupled to the differential, away from the transmission, to lock axle half-shafts of the vehicle, thereby occupying less space while providing robust control of vehicle motion as well as relying on an actuator with a smaller footprint and lower power demands than previous park lock systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 4-15 are shown approximately to scale. However, other relative component dimensions may be used, in other embodiments.

DETAILED DESCRIPTION

Figure 1:
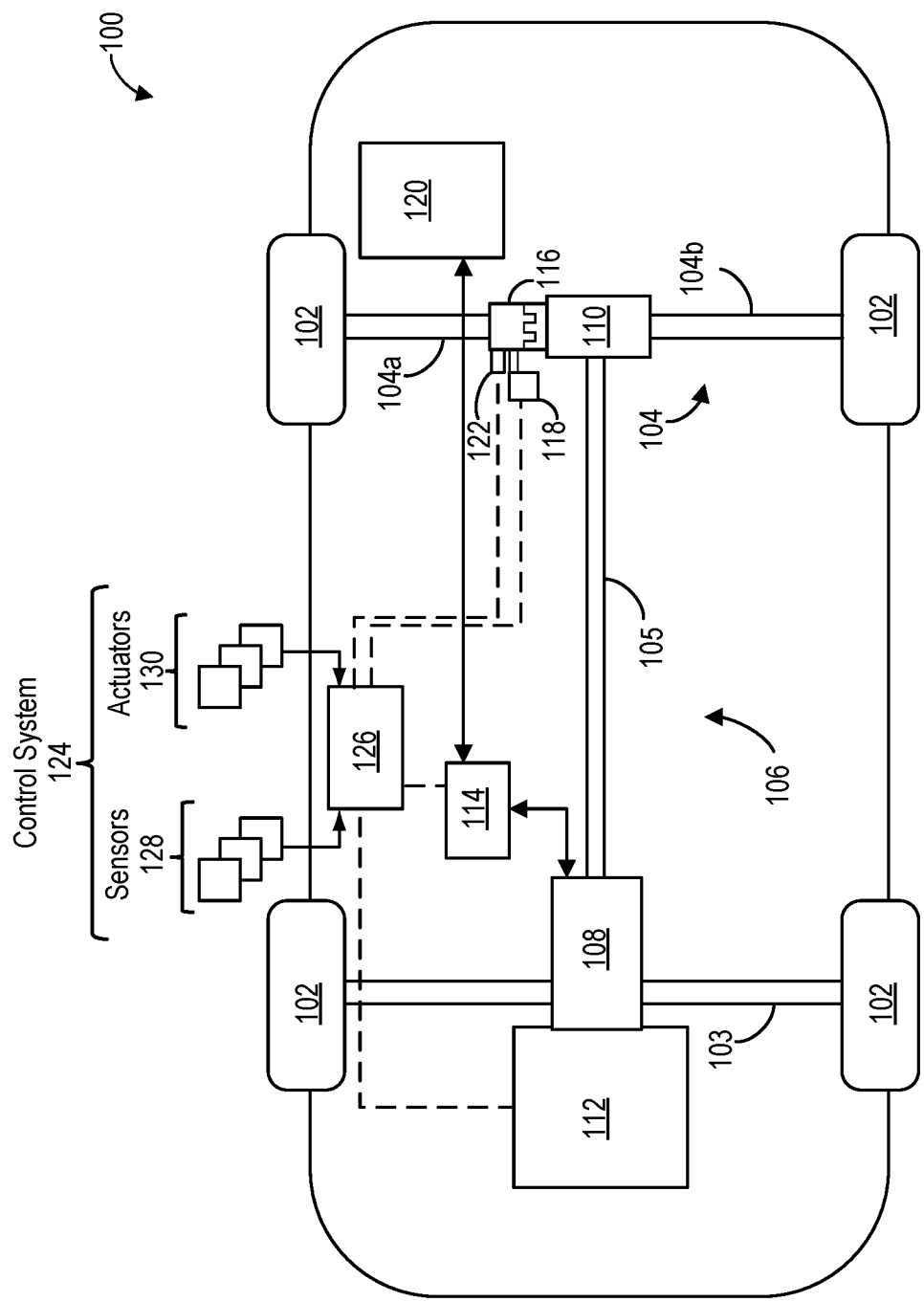
FIG. 1 shows a schematic diagram of a drive train of a vehicle.
Figure 2:
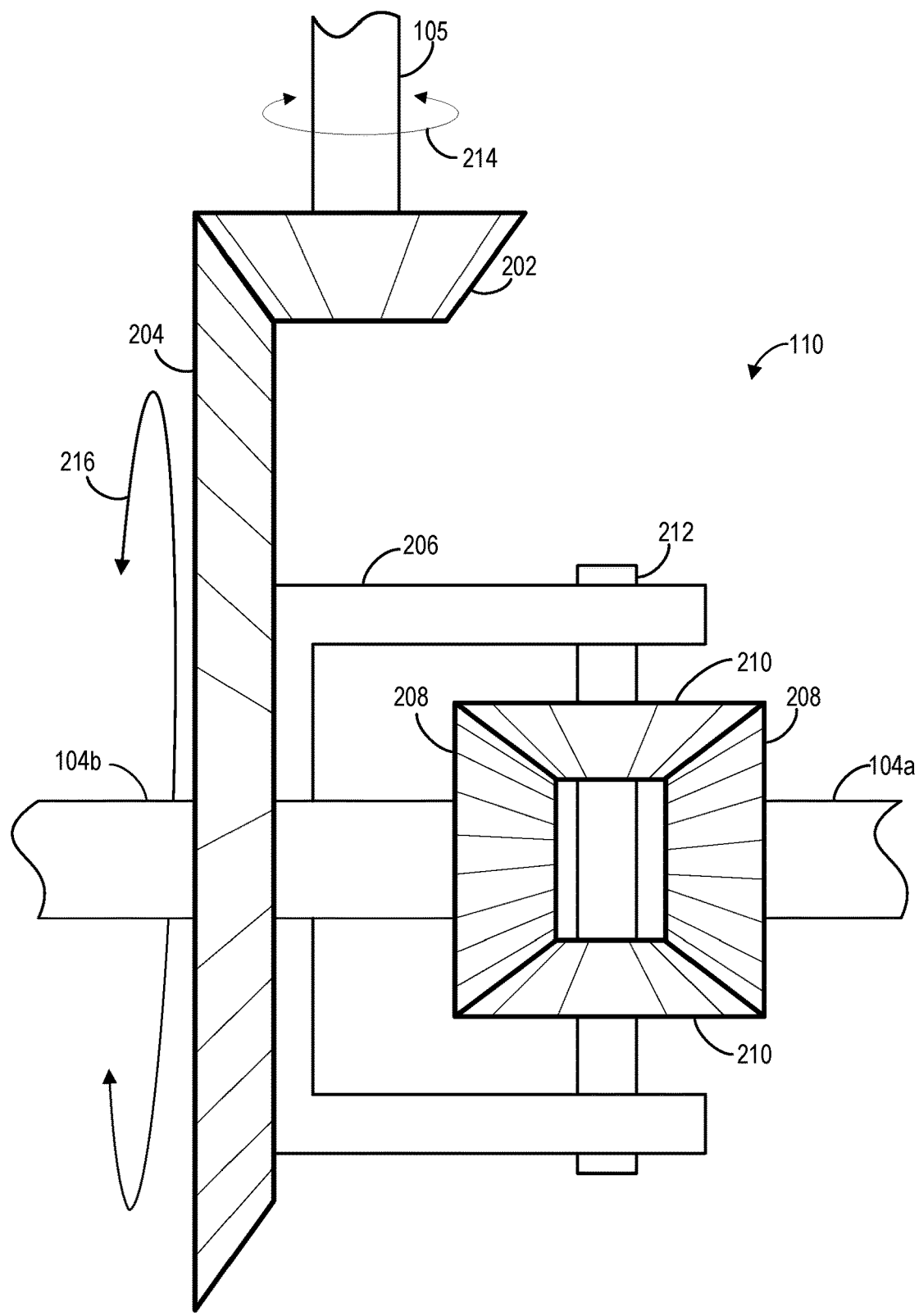
FIG. 2 shows a diagram of a differential of the drive train of FIG. 1.
Figure 3A:
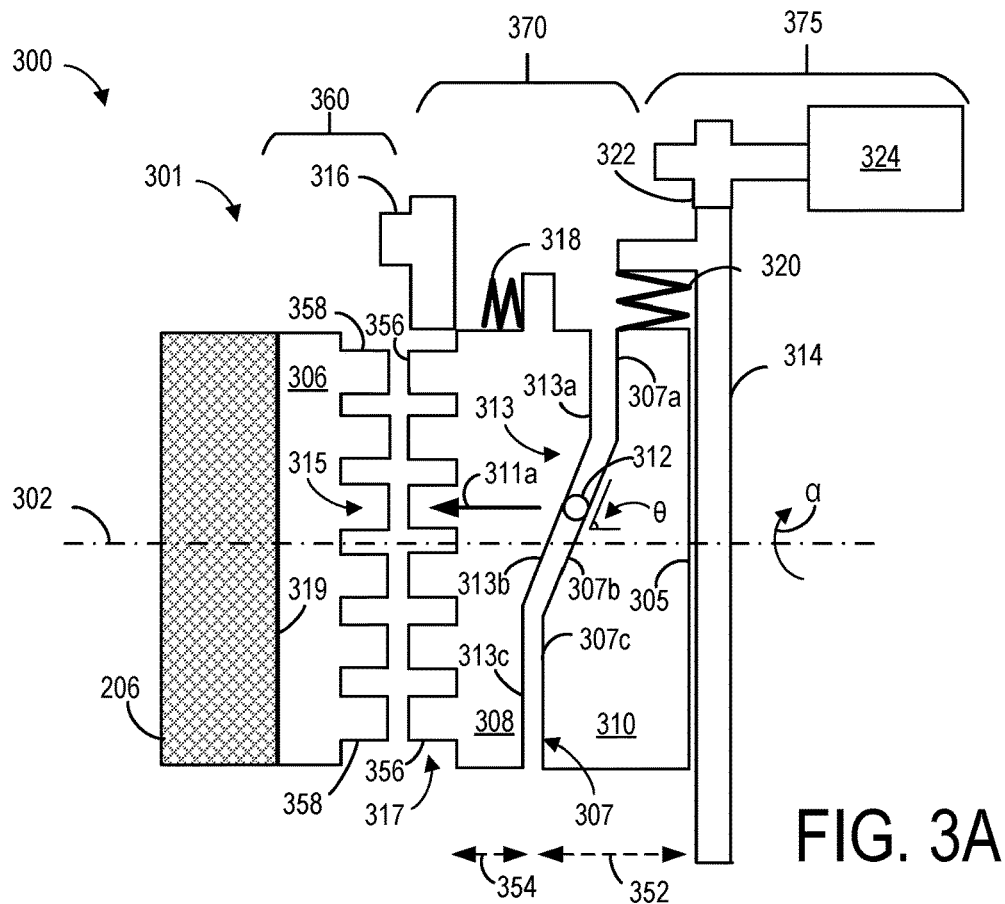
FIG. 3A shows a block diagram of an example of a park lock in a disengaged position, which may be implemented in the vehicle of FIG. 1.
Figure 3B:
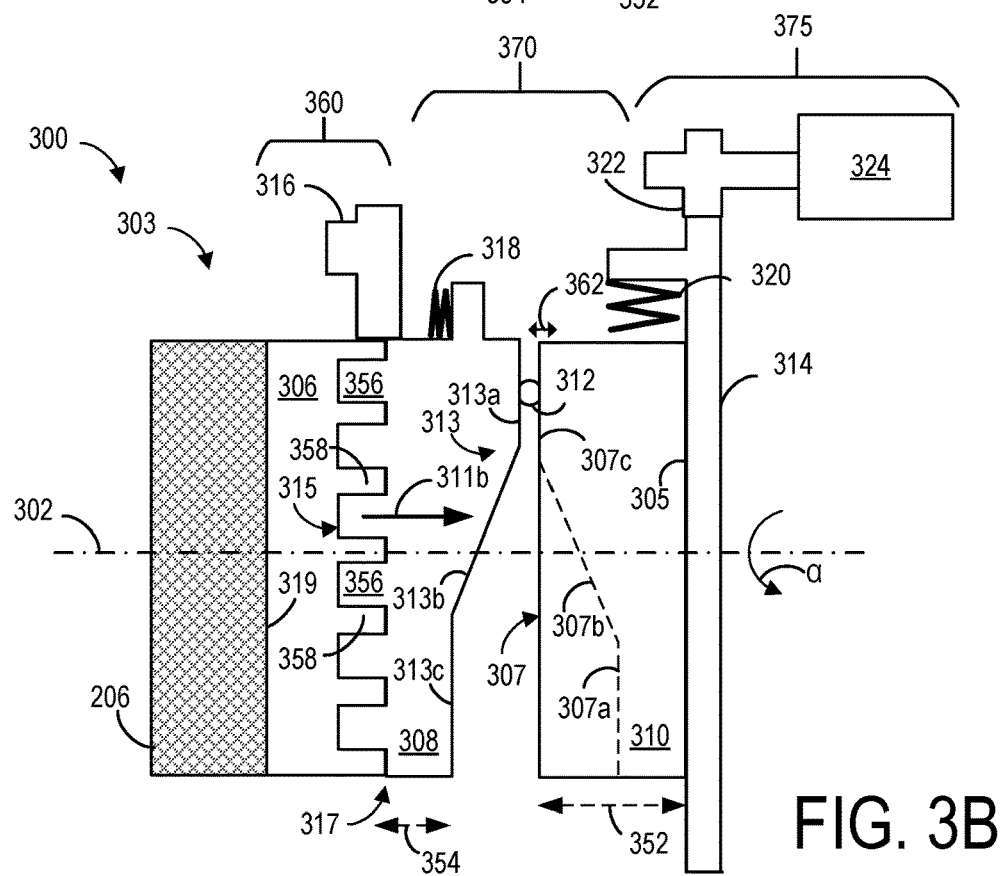
FIG. 3B shows the example of the park lock of FIG. 3A in an engaged position.

The following description relates to systems and methods for a park lock. The park lock may be implemented in a drive train of a vehicle. An example of a vehicle drive train is depicted in FIG. 1. The drive train may include a differential coupled to axle shafts of the vehicle, as shown in FIG. 2, and a portion of the park lock may be attached to a casing of the differential, as shown in FIGS. 3A-3B, as well as in a perspective view of an embodiment of the park lock in FIG. 6. The park lock is illustrated in a disengaged configuration in FIG. 3A and an engaged configuration in FIG. 3B. Operation of the park lock is shown in an example of a method for operating the park lock in FIG. 16 and routines for engaging and disengaging the park lock are depicted in FIGS. 17 and 18, respectively. Various views of the park lock and individual components of the park lock are shown in FIGS. 4-5 and 7-15 for the embodiment of the park lock depicted in FIG. 6.

FIGS. 1-15 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, a schematic representation of a vehicle 100 is depicted. It will be appreciated that vehicle 100 is shown in FIG. 1 for illustrative purposes and is a non-limiting example of how the vehicle may be configured. Other examples include various arrangements and positioning of components of the vehicle described below as well as additional components not shown in FIG. 1 for brevity. Vehicle 100 may be an internal combustion engine (ICE) vehicle, a hybrid electric vehicle (HEV), as shown in FIG. 1, or an all-electric vehicle (EV). Vehicle 100 includes wheels 102, e.g., front wheels and rear wheels, with the front wheels 102 coupled by a front axle 103 and the rear wheels 102 coupled by a rear axle 104. As shown in FIG. 1, the vehicle 100 may be configured with rear-wheel drive but other examples include vehicles with front-wheel drive, four-wheel drive or all-wheel drive.

A drive train 106 of vehicle 100 may include a transmission 108 (e.g., a gear box, gear train, etc.) configured to receive torque input from a rotating source and output torque to a drive shaft 105. When configured as the ICE vehicle, the rotating source may be an engine 112. As the HEV, vehicle 100 may have more than one rotating source, including the engine 112 and an electric machine 114. When vehicle 100 is the EV, engine 112 may be omitted and at least one additional electric machine may be incorporated. In some examples, the electric machine 114 may be a motor/generator, with a capacity to convert electrical energy into mechanical energy and vice versa. As such, the electric machine 114 may be electrically coupled to a traction battery 120 of vehicle 100 to both draw power from the traction battery 120 and generate electrical energy to be stored at the traction battery 120.

The drive shaft 105 extends between the transmission 108 and a differential 110 and is engaged by the transmission 108 to output torque that is adjusted based on gearing at the transmission 108 to accommodate desired vehicle operation. The differential 110 is arranged at a central region of the rear axle 104, which is formed of a first axle half-shaft 104a and a second axle half-shaft 104b. Rotation of the drive shaft 105 drives rotation of various gears, such as side gears, pinion gears, etc., of the differential 110, which is transferred to rotation of the first and second axle half-shafts 104a, 104b.

The differential 110 may be configured as any of an open, a locking, a limited-slip, and a torque-vectoring differential. The gears of the differential 110 allow the first and second axle half-shafts 104a, 104b to spin at different speeds while receiving power from the rotating source (e.g., the engine 112 or the electric machine 114), thereby allowing the drive wheels 102 coupled to the first and second axle half-shafts 104a, 104b to navigate through turns smoothly. In other words, the differential 110 may control a split of power input from the drive shaft 105 between the drive wheels 102.

The differential 110 is depicted as a schematic diagram in FIG. 2, coupled to the first and second axle half-shafts 104a, 104b of FIG. 1, as well as the drive shaft 105. An end of the drive shaft 105 includes a pinion drive gear 202 which engages a ring gear 204 of the differential 110. The ring gear 204 may be fixedly coupled to a differential casing 206 such that rotation of the ring gear 204 may drive rotation of the differential casing 206. The second axle half-shaft 104b may extend through a central opening of the ring gear 204 without contacting the ring gear 204.

The differential casing 206 encloses a set of gears including side gears 208 (or sun gears) attached to ends of the first and second axle half-shafts 104a, 104b. The side gears 208 are parallel with one another and spaced away from one another by planet pinions 210, also included in the set of gears. The planet pinions 210 are parallel with and spaced away from one another and oriented perpendicular to the side gears 208. Teeth of the planet pinions 210 mesh, e.g., interlock, with teeth of the side gears 208 so that each of the planet pinions 210 engages with both of the side gears 208 and motion may be transferred to each gear of the set of gears within the differential casing 206 via a single input.

Rotational motion is input to the gears by a pinion shaft 212. The pinion shaft 212 is coupled to and extends through each of the planet pinions 210. The pinion shaft 212 also extends through the differential casing 206 and may be inserted through openings in the differential casing 206, thereby maintaining a position of the planet pinions 210. Rotation of the differential casing 206 is transferred to the side gears 208 through the pinion shaft 212.

For example, rotation of the drive shaft 105 and the pinion drive gear 202, as indicated by arrow 214, causes the ring gear 204 to turn, as indicated by arrow 216, due to engagement of the pinion drive gear 202 with the ring gear 204. Turning of the ring gear 204 forces the differential casing 206 to also rotate according to arrow 216 as well as the pinion shaft 212, with the differential casing 206 and the pinion shaft 212 rotating together as a unit. As the pinion shaft 212 rotates, the motion is transferred to the first and the second axle half-shafts 104a, 104b due to coupling of the pinion shaft 212 to the planet pinions 210 and coupling of the planet pinions 210 to the side gears 208. During instances where different rotational speeds of the axle half-shafts is demanded, such as when a vehicle is turning, asymmetric rotation of the axle half-shafts is enabled by the planet pinions 210.

The differential 110 may be further enclosed by an axle housing (not shown) which may cover the differential and the axle half-shafts continuously. The axle housing may be configured to remain stationary and allow the axle (e.g., the axle half-shafts and the differential) to spin therein unhindered while shielding the axle and the differential from external objects. The axle housing may also provide lubrication to the axle.

Returning to FIG. 1, the transmission 108 may be an automatic transmission, in one example, and vehicle 100 may be adjustable to a park mode at an operator-controlled gearbox. In a conventional system, adjustment of vehicle 100 to the park mode may activate engagement of a parking pawl to a gear of the transmission 108 that is fixedly coupled to the drive shaft 105. By engaging the parking pawl, the drive shaft 105 is maintained stationary based on a status of the transmission 108 and the differential 110 and the wheels 102 are thereby also maintained stationary.

However, in some instances, a torque applied to the parking pawl may be high. For example, if the vehicle is large and parked on an incline, the torque imposed on the parking pawl may correspond to the vehicle mass and/or degree of incline and may lead to wear on the parking pawl. Over time, a locking capability of the parking pawl may be degraded. Increasing a size of the parking pawl may allow the parking pawl to tolerate greater applied torque but may increase a footprint of the parking pawl and the gear engaged by the parking pawl. Furthermore, the larger parking pawl may demand a more rigorous actuation system that draws an undesirable amount of power.

In one example, as described herein, the drive train 106 may include a park lock 116 which locks the differential 110 to the axle housing. In other examples, the park lock may lock a different, moving part of the vehicle to a different, stationary part of the vehicle. For example, the park lock 116 may also be used to lock transmission gears, such as a locking an output gear to a housing of the transmission. The park lock 116 may include a dog clutch mechanism with a first portion fixedly coupled to the rotating part of the vehicle, e.g., the differential casing 206 of FIG. 2, and a second portion coupled to the stationary part of the vehicle, e.g., the axle housing. A sliding motion of a section of the second portion of the park lock 116 may be facilitated by actuation of a motor 118. The first portion and the second portion of the dog clutch may have protrusions, or teeth, that, when meshed together, lock the first and second portions in place with respect to rotation about an axis of rotation of the rear axle 104. The sliding motion of the second portion of the park lock 116 may rely on two ramped cams sandwiching balls configured to roll along ramps of the cams. By utilizing the dog clutch mechanism as an alternative to the conventional parking pawl, a more robust park lock with a small footprint, reduced power demands, and low weight is provided. Further details of the park lock 116 are described below, with reference to FIGS. 3A-18.

Vehicle 100 may further include a control system 124, including a controller 126, sensors 128, and actuators 130. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include a position sensor 122 coupled to the park lock 116 to monitor a position of the second portion of the park lock 116, a sensor at a user-operated gear box enabling adjustment of the transmission between modes, a Hall effect sensor at the engine 112 to measure a crankshaft speed, a pedal position sensor to detect a depression of an operator-actuated pedal, such as an accelerator pedal or a brake pedal, speed sensors at the vehicle wheels 102, etc. Upon receiving the signals from the various sensors 128 of FIG. 1, controller 126 processes the received signals, and employs various actuators 130 of vehicle 100 to adjust engine and drive train operations based on the received signals and instructions stored on the memory of controller 126. For example, controller 126 may receive a signal from the user-operated gear box sensor indicating adjustment of the transmission to the park mode. In response, the controller 126 may command activation of the motor 118 of the park lock 116 to engage the park lock 116.

FIGS. 3A and 3B depict schematic representations of a park lock 300 for a vehicle, such as the vehicle 100 of FIG. 1. Sub-components of the park lock 300 elements described with respect to FIGS. 3A and 3B are omitted for brevity but are described in detail further below. The park lock 300 is shown in a first, disengaged position 301 in FIG. 3A and a second, engaged position 303 in FIG. 3B. A general overview of how to engage and disengage the park lock will be described first with reference to FIGS. 3A and 3B. Adjustment of the park lock between the first position 301 and the second position 303 may be further clarified based on details of the park lock component structures provided in the figures and descriptions following FIGS. 3A and 3B.

The park lock 300 may be an embodiment of the park lock 116 shown in FIG. 1 and may be coupled to a differential, such as the differential 110 of FIGS. 1 and 2. The park lock 300 is formed of a first portion 360, a second portion 370, and an actuating portion 375. The first portion 360 may be a first clutch member of a dog clutch and includes a sprocket 306 fixedly coupled to the differential casing 206 (e.g., of FIG. 2). The second portion 370 may be a second clutch member of the dog clutch and includes a pawl assembly 308. The actuating portion 375 includes an actuator 324, which may be similar to the motor 118 of FIG. 1, a drive gear 322 in contact with a driven gear 314, and a drive cam 310. Interfacing elements may be disposed and captured between the drive cam 310 and the pawl assembly 308. A sub-component of the pawl assembly, e.g., a park lock frame, may be fixedly coupled to an axle housing such that the sub-component remains stationary.

Figure 5:
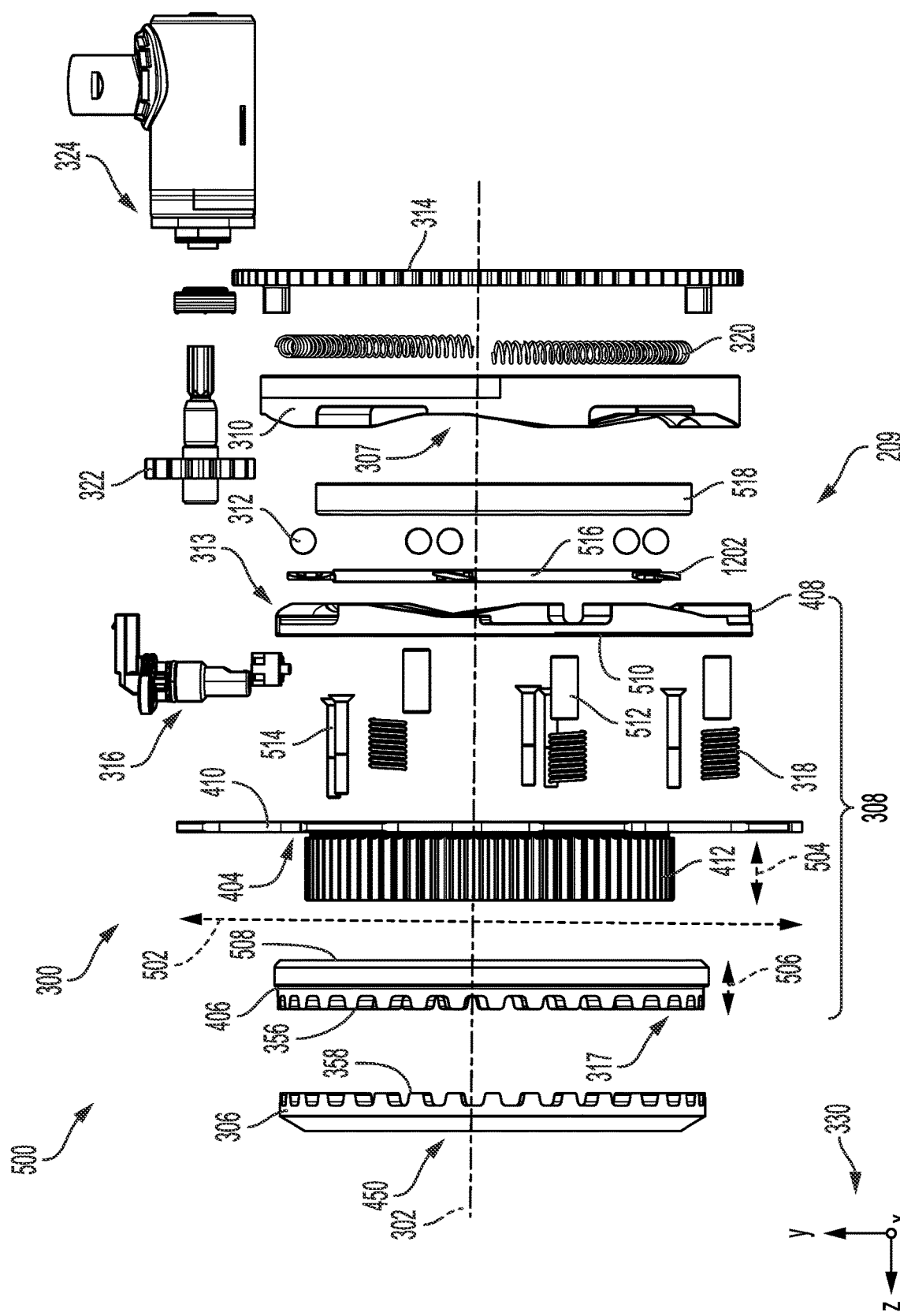
FIG. 5 shows an exploded view of the park lock of FIG. 4.
Figure 15:
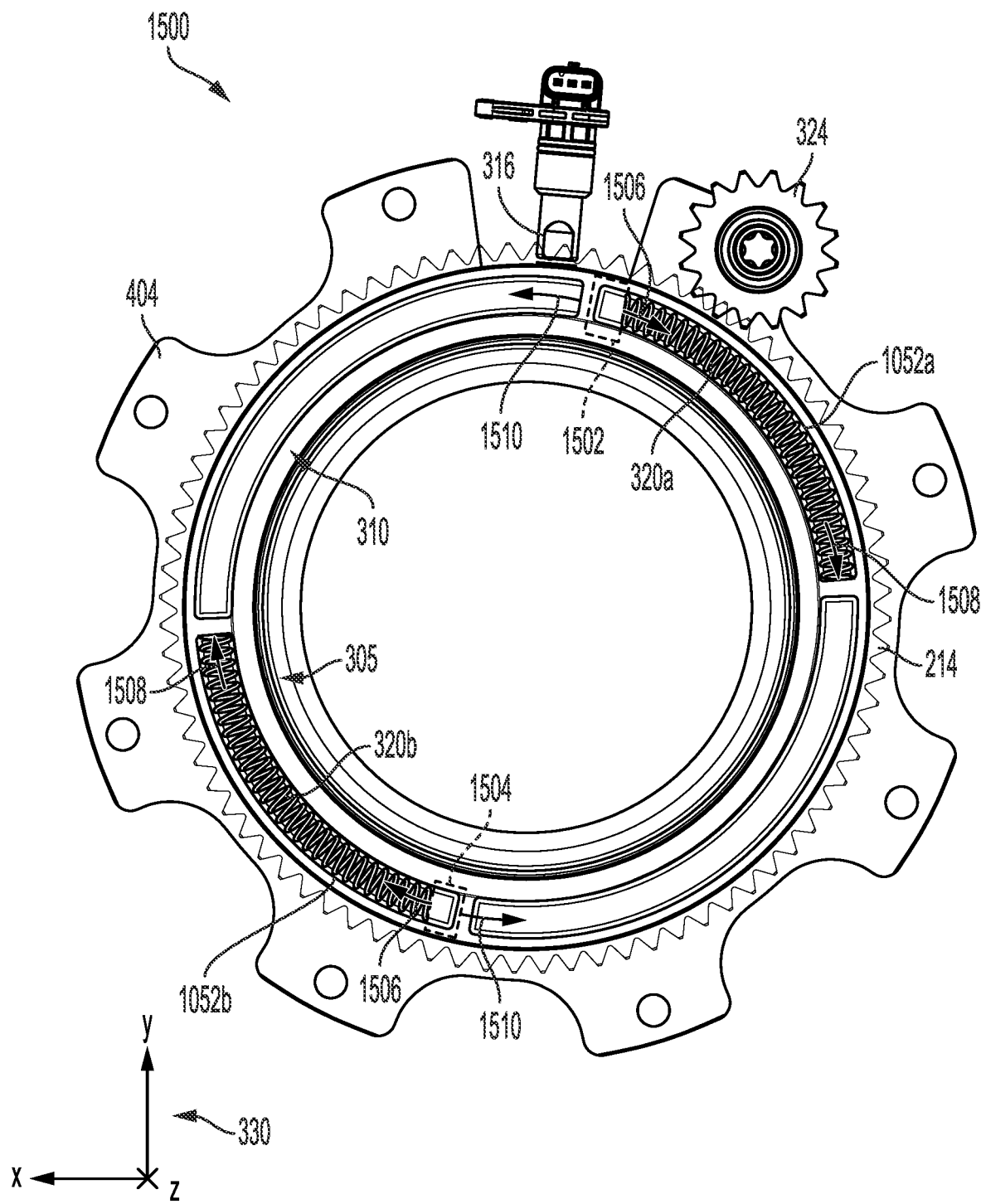
FIG. 15 shows a front view of the drive cam of the park lock.

The driven gear 314, the drive cam 310, the pawl assembly 308, and the sprocket 306 may be aligned along a central axis of rotation 302 of the park lock 300. The drive gear 322 may compel rotation of the driven gear 314 when the drive gear 322 is rotated by the actuator 324. The driven gear 314 includes a structure that interacts with a ratcheting spring 320 that may be compressed and released based on rotation of the driven gear. It will be appreciated that while the following discussion describes one ratcheting spring, more than one ratcheting is included in the drive cam 310, as shown in FIGS. 5 and 15.

Figure 10B:
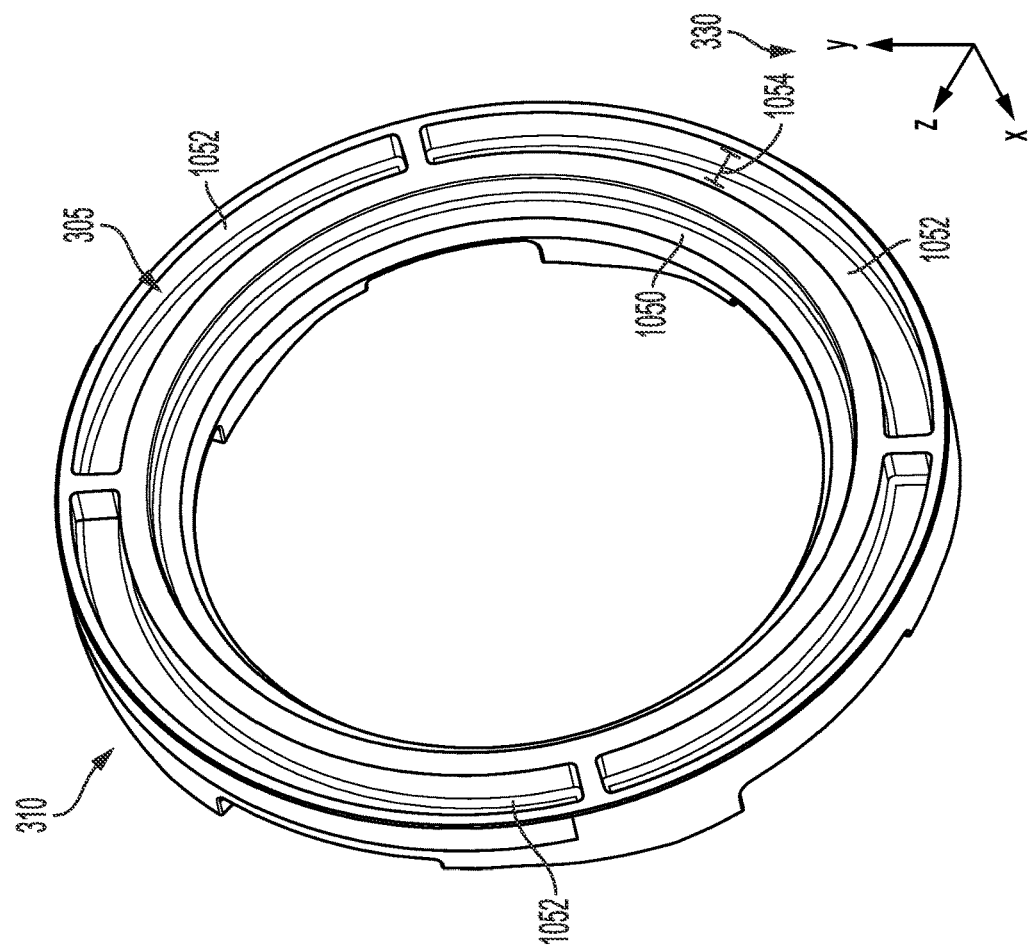
FIG. 10B shows a second perspective view of the drive cam of the park lock.
Figure 13:
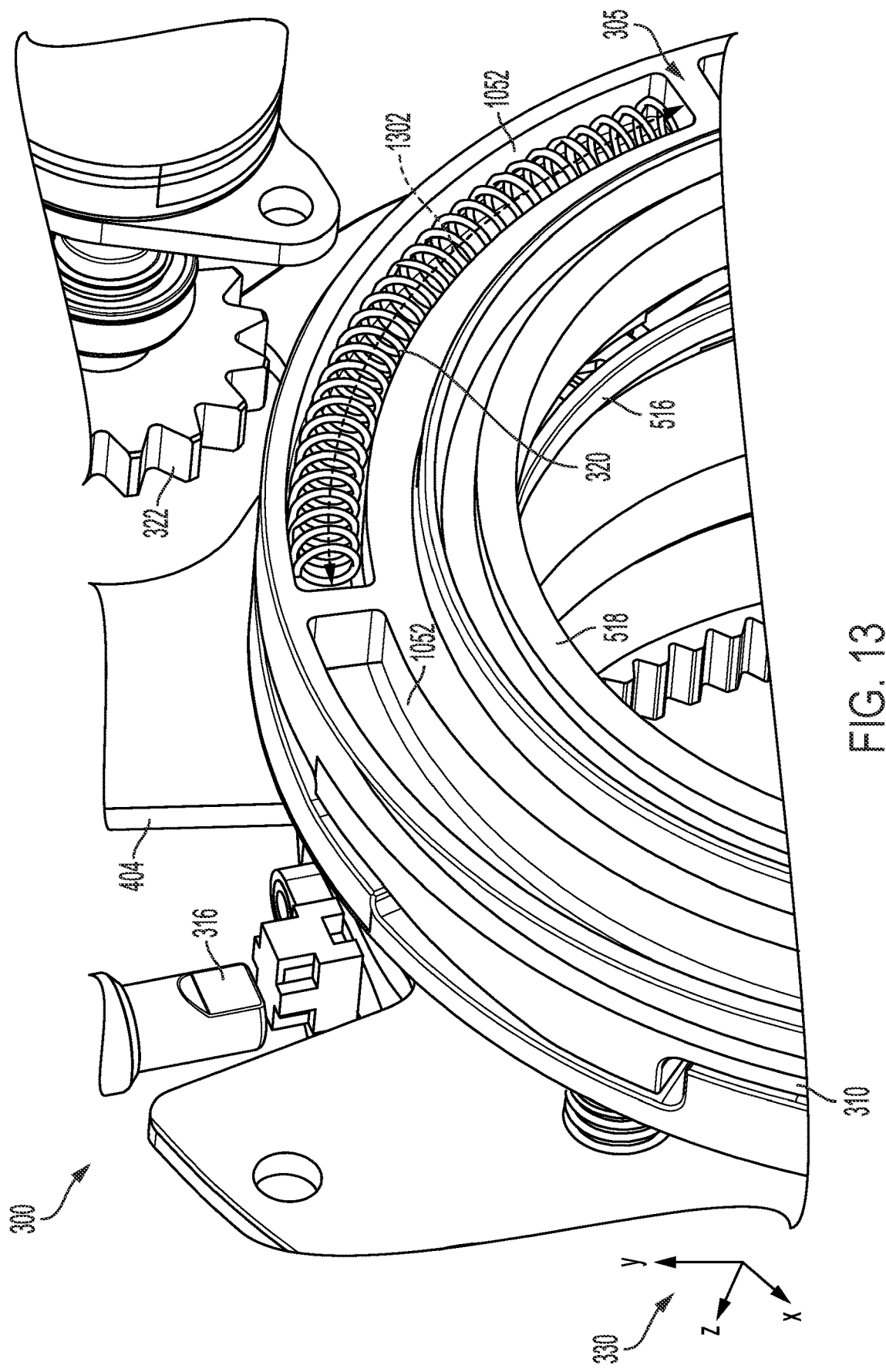
FIG. 13 shows a view of a ratcheting spring embedded in the drive cam of the park lock.
Figure 14:
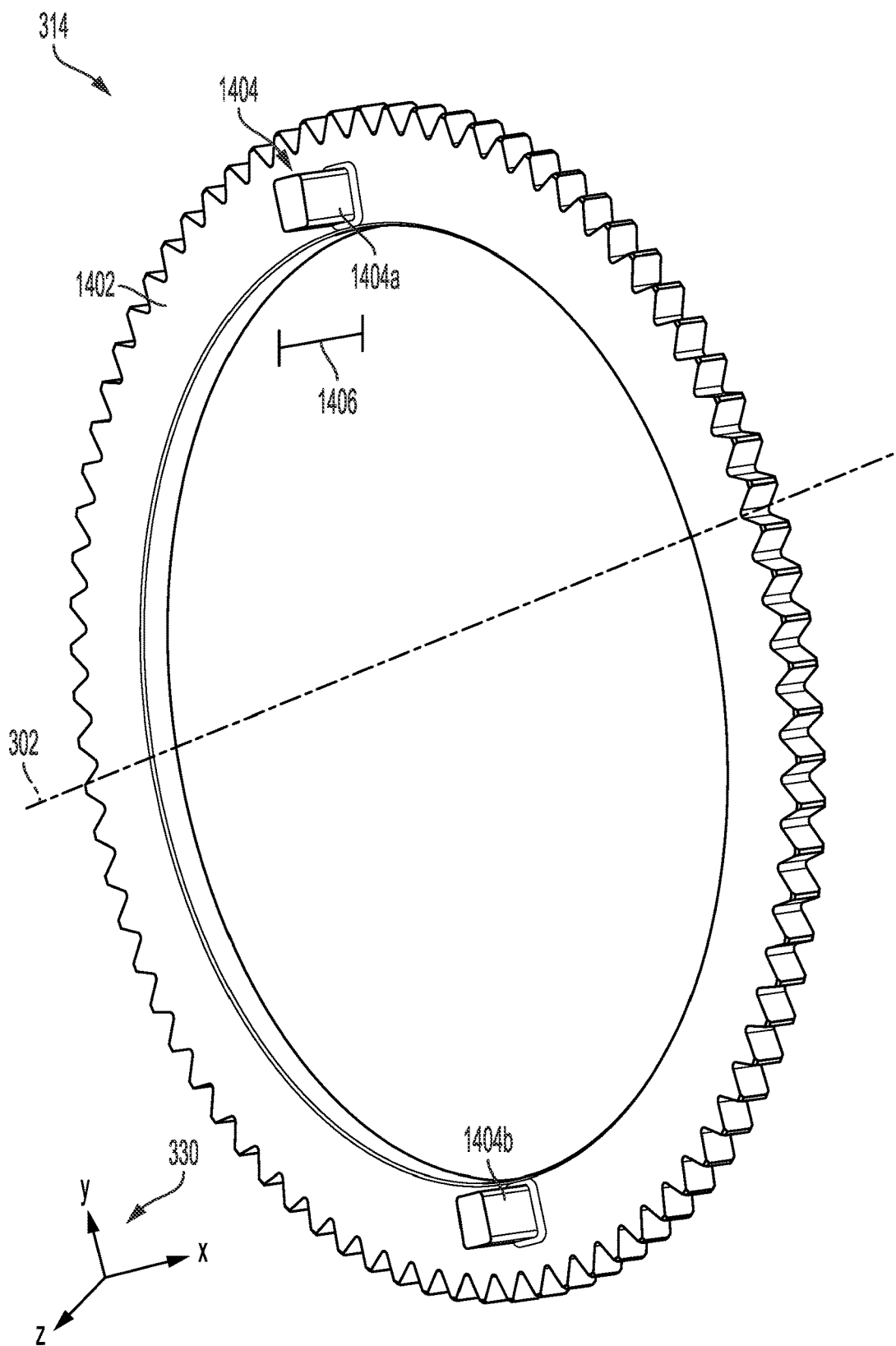
FIG. 14 shows a driven gear of the park lock.

The ratcheting spring 320 may be embedded in a first face 305 of the drive cam 310 that faces the driven gear 314, e.g., where the drive cam 310 and the driven gear 314 are in face-sharing contact, and oriented such that the ratcheting spring 320 extends in a radial direction along the first face 305 of the drive cam 310. For example, the ratcheting spring 320 may be nested in a furrow of the first face 305 of the drive cam 310 facing the driven gear 314, as shown in FIGS. 10B, 13, and 15, and described further below. The structure of the driven gear 314 interacting with the ratcheting spring 320 may be at least one detent, as shown in FIGS. 5 and 14, protruding from a surface of the driven gear in face-sharing contact with the drive cam 310. The detent may protrude into one end of the furrow in which the ratcheting spring 320 is nested and abut an end of the ratcheting spring 320. When the driven gear 314 is rotating, the detent may exert a force on the end of the ratcheting spring 320 in a radial direction, causing the ratcheting spring 320 to be compressed. The ratcheting spring 320 may have a high spring force, e.g., a high degree of stiffness, that resists the compressive force and compels expansion of the ratcheting spring 320 in response to the compression. The stiffness of the ratcheting spring 320 may drive engagement of the park lock 300 when adjusted to the second position 303 of FIG. 3B.

Figure 10A:
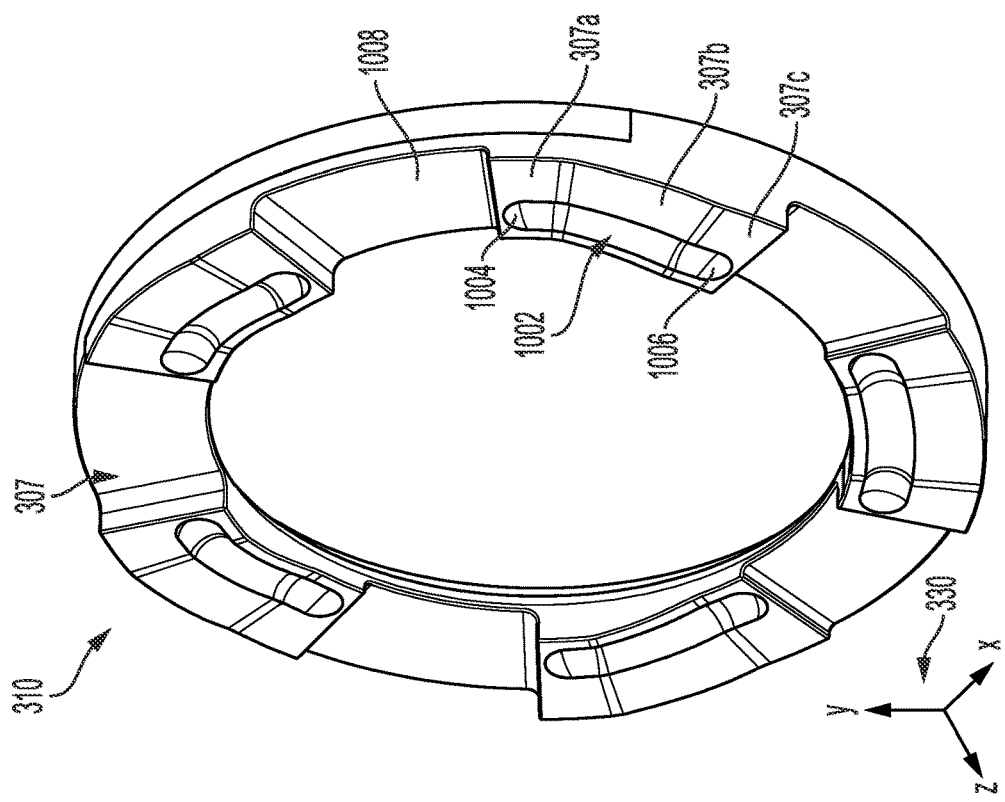
FIG. 10A shows a first perspective view of a drive cam of the park lock.

The first face 305 of the drive cam 310 may be planar and arranged perpendicular to the central axis of rotation 302. A second face 307 of the drive cam 310 is not planar and includes a set of regions, the set of regions including a first region 307a, a second region 307b, and a third region 307c, where the second region 307b is positioned between the first region 307a and the third region 307c. It will be appreciated that the second face 307 includes more than one of the set of regions arranged around a circumference of the drive cam 310. For example, as shown in FIGS. 5 and 10A, the set of regions may be repeated five times around the second face 307 of the drive cam 310, where the repetitions are evenly distributed around the second face 307. As shown in FIGS. 3A-3B, a profile of the drive cam 310 at the second face 307 may vary according to the set of regions, e.g., a protrusion of the second face 307 along the central axis of rotation 302 may vary between the first, second, and third regions 307a, 307b, 307c.

For example, the first region 307a may be offset from the third region 307c along a plane perpendicular to the central axis of rotation 302 such that a thickness 352 of the drive cam 310 is reduced at the first region 307a relative to the third region 307c. The second face 307, at each of the first region 307a and the third region 307c may be planar and perpendicular to the central axis of rotation 302. At the second region 307b, the second face 307 is sloped, e.g., at an angle θ relative to the central axis of rotation 302 that is less than 90 degrees, and continuous with the second face 307 at the first and third regions 307a, 307c. While a slope of the second region 307b is linear in FIGS. 3A-3B, in other examples, the slope may be curved. In one example, θ may be 60 degrees. In other examples, θ may be an angle between 30-80 degrees.

Figure 12:
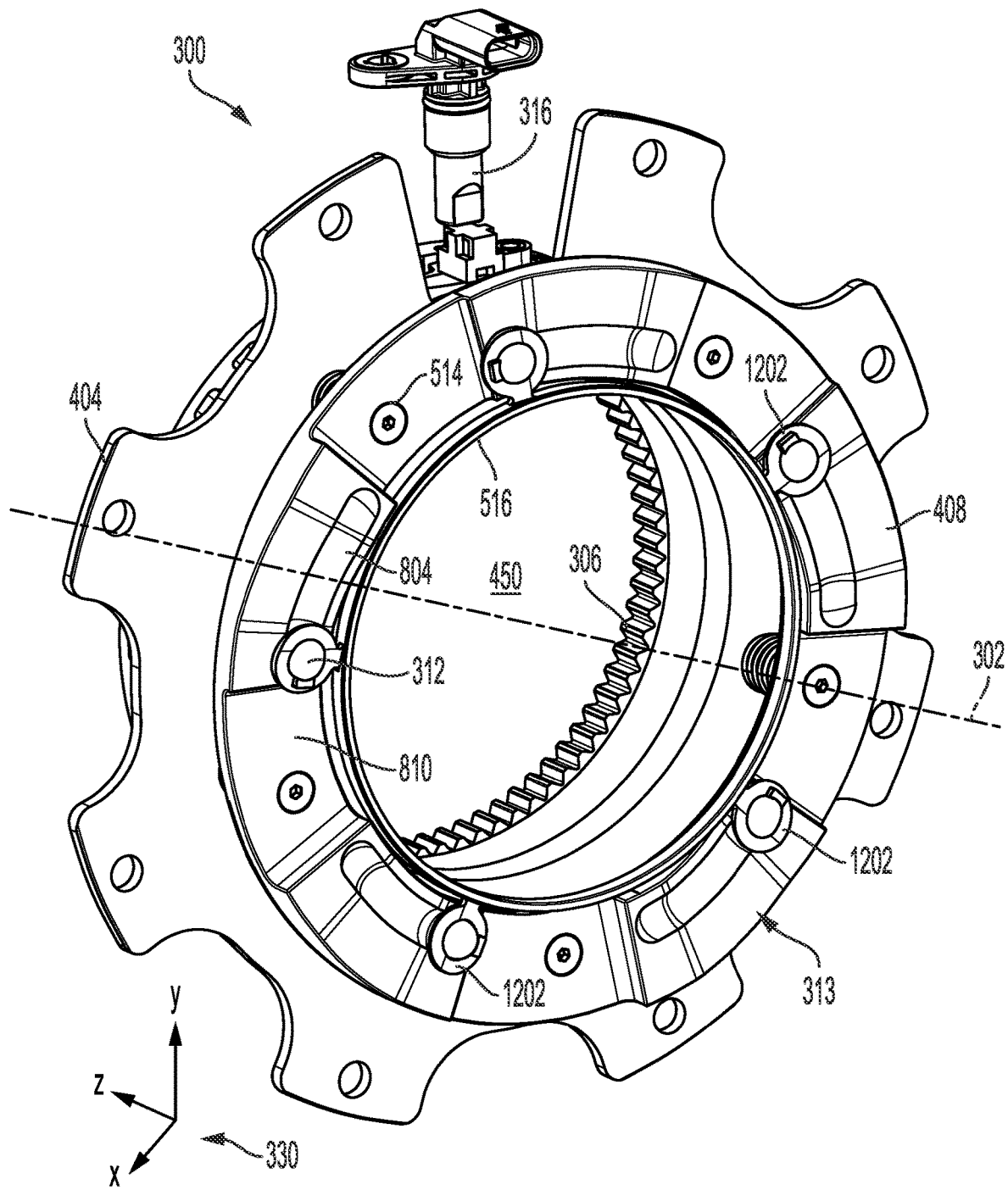
FIG. 12 shows a view of a pawl-driven cam of the park lock.

The drive cam 310 may be adjacent to but not directly in contact with the pawl assembly 308. Instead, forces may be exerted on the pawl assembly 308 by the drive cam 310 via a plurality of balls 312. It will be noted that only one ball 312 is depicted in FIGS. 3A-3B for brevity and in practice, more than one ball 312 is implemented in the park lock 300. For example, as shown in FIGS. 5 and 12, five balls 312 may be included in the park lock 300. The ball 312 (e.g., the plurality of balls) may be configured to roll with respect to both the pawl assembly 308 and the drive cam 310, where the ball 312 moves along a groove in a first face 313 of the pawl assembly 308 and a corresponding track in the second face 307 of the drive cam 310, where the groove and the track have similar structures and each includes a ramp.

Figure 8:
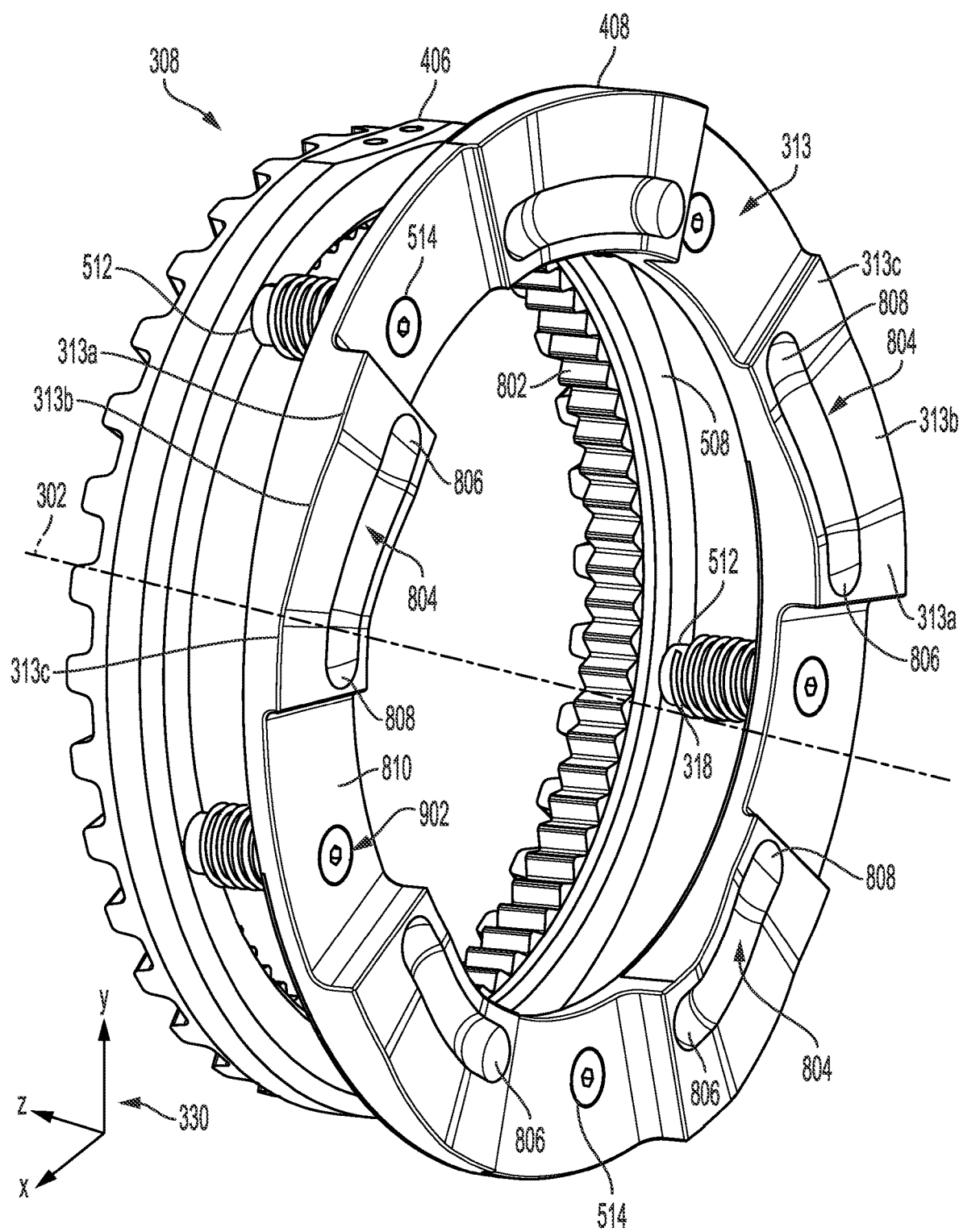
FIG. 8 shows a perspective view of a portion of a pawl assembly of the park lock.

The ball 312 may also be configured as an interface between the drive cam 310 and the pawl assembly 308. In other words, the ball 312 is in contact with both of the drive cam 310 and the pawl assembly 308 and maintains contact with both components when the drive cam 310 is stationary and when the drive cam 310 is rotating. The first face 313 of the pawl assembly 308 faces the drive cam 310 and has a similar profile to the second face 307 of the drive cam 310. For example, the first face 313 of the pawl assembly 308 has a set of regions including a first region 313a, a second region 313b, and a third region 313c. The set of regions may be repeated around a circumference of the first face 313 of the pawl assembly 308. For example, five repetitions of the set of regions may be disposed in the first face 313 of the pawl assembly 308, as shown in FIGS. 5, 8, and 12.

Similar to the set of regions of the second face 307 of the drive cam 310, the first region 313a and the third region 313c of the first face 313 of the pawl assembly 308 are planar and perpendicular to the central axis of rotation 302. The second region 313b extends between the first region 313a and the third region 313c at, for example, the angle θ, and a slope of the second region 313b may be linear or curved. A thickness 354 of the pawl assembly 308 varies along the set of regions of the first face 313. For example, the thickness of the pawl assembly 308 at the first region 313a may be greater than the thickness at the third region 313c.

Figure 11:
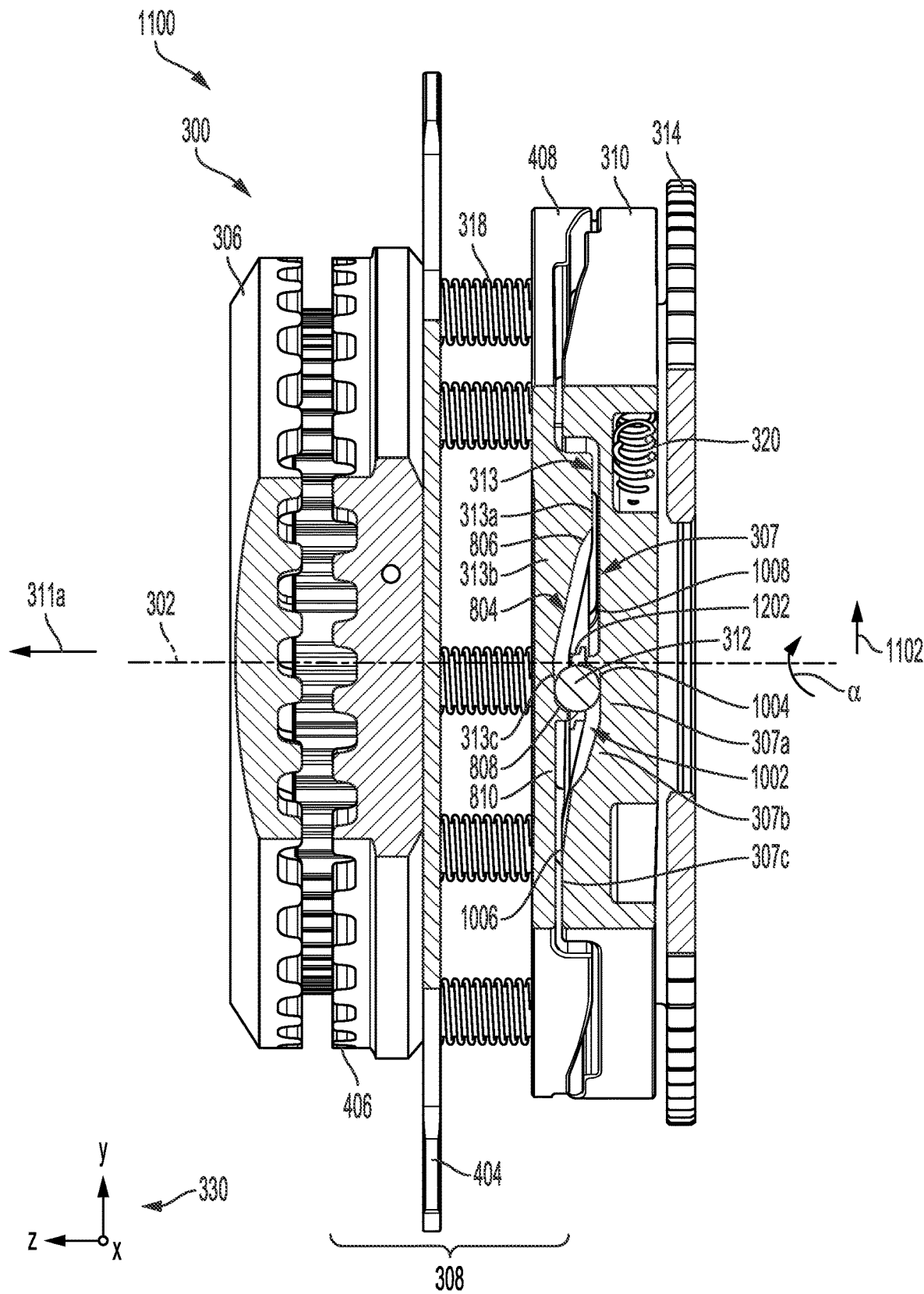
FIG. 11 shows a cut-away side view of the park lock.

It will be noted that although the second region 307b of the second face 307 of the drive cam 310 is shown aligned with the second region 313b of the first face 313 of the pawl assembly 308 along a direction parallel with the central axis of rotation 302 in FIG. 3A, the configuration is a simplified, representative illustration of the relative positioning of the drive cam 310 and the pawl assembly 308 in the first position 301 of FIG. 3A. The schematic diagram of the park lock 300 of FIGS. 3A and 3B demonstrate a relative motion of the ball 312. As shown in the figures following FIGS. 3A and 3B, an actual alignment of the drive cam 310 and the pawl assembly 308 may deviate from that shown in FIGS. 3A and 3B. For example, as shown in FIG. 11, when the park lock 300 is in the first, disengaged position 303, an actual relative configuration of the park lock 300 may include aligning the third region 313c of the first face 313 of the pawl assembly 308 with the first region 307a of the second face 307 of the drive cam 310. Descriptions of movement of the ball 312 with respect to FIGS. 3A-3B are therefore non-limiting and for illustrative purposes only. The actual relative positioning of the ball 312 when implemented in the embodiment of the park lock 300 shown in FIGS. 4-15 may vary from the discussion of the ball 312 with reference to FIGS. 3A-3B. An effect of the ball 312 moving along ramped elements in the pawl assembly 308 and the drive cam 310, however, is consistent.

A second face 317 of the pawl assembly 308 may face the sprocket 306. The second face 317 may be adapted with a plurality of teeth 356. The plurality of teeth of the pawl assembly 308 may be configured to fit between a plurality of teeth 358 of a first face 315 of the sprocket 306 such that the plurality of teeth 356 of the pawl assembly 308 mesh with the plurality of teeth 358 of the sprocket 306 when the park lock 300 is adjusted to the second, engaged position 303 of FIG. 3B. Each of the plurality of teeth 356 of the pawl assembly 308 and the plurality of teeth 358 of the sprocket 306 may be protrusions extending from opposite directions, parallel with the central axis of rotation 302, towards one another and each of the plurality of teeth may have similar spacing (e.g., distance between each individual tooth of the plurality of teeth 356 along a direction perpendicular to the central axis of rotation 302). The plurality of teeth 356 of the pawl assembly 308 and the plurality of teeth 358 of the sprocket 306 may each include a similar number of teeth such that, when the park lock 300 is adjusted to the second, engaged position 303 of FIG. 3B, a potential slip of each of the pluralities of teeth 356, 358, relative to each other, is minimized. Therefore, the park lock 300 may be able to withstand high torque demands, as may be present when parking a large vehicle on an incline, for example, compared to a park lock configured with a one-tooth pawl.

The pawl assembly 308 may be maintained stationary relative to the central axis of rotation 302. In other words, the pawl assembly 308 does not rotate. However, subcomponents of the pawl assembly 308 may shift, or slide, axially, along the central axis of rotation 302 as indicated by arrow 311a in FIG. 3A and arrow 311b in FIG. 3B. The position of the pawl assembly 308 along the central axis of rotation 302 may be controlled by a combination of a force exerted on the pawl assembly 308 by the drive cam 310, transmitted through the ball 312, and a force exerted on the pawl assembly 308 by one or more jounce springs 318. As the force exerted by the drive cam 310 originates from rotation of the driven gear 314 when the drive gear 322 is rotated by the actuator 324, a translation of rotation motion from the drive cam 310 to axial motion of the pawl assembly 308 may relieve a power demand on the actuator 324 compared to a conventional park lock, where an actuator may directly control axial sliding of one a first and a second clutch dogs to engage the dogs and therefore the park lock. The jounce springs 318 extend axially, e.g., parallel with the central axis of rotation 302, between the park lock frame and a pawl-driven cam of the pawl assembly 308, as described further below.

Figure 4:
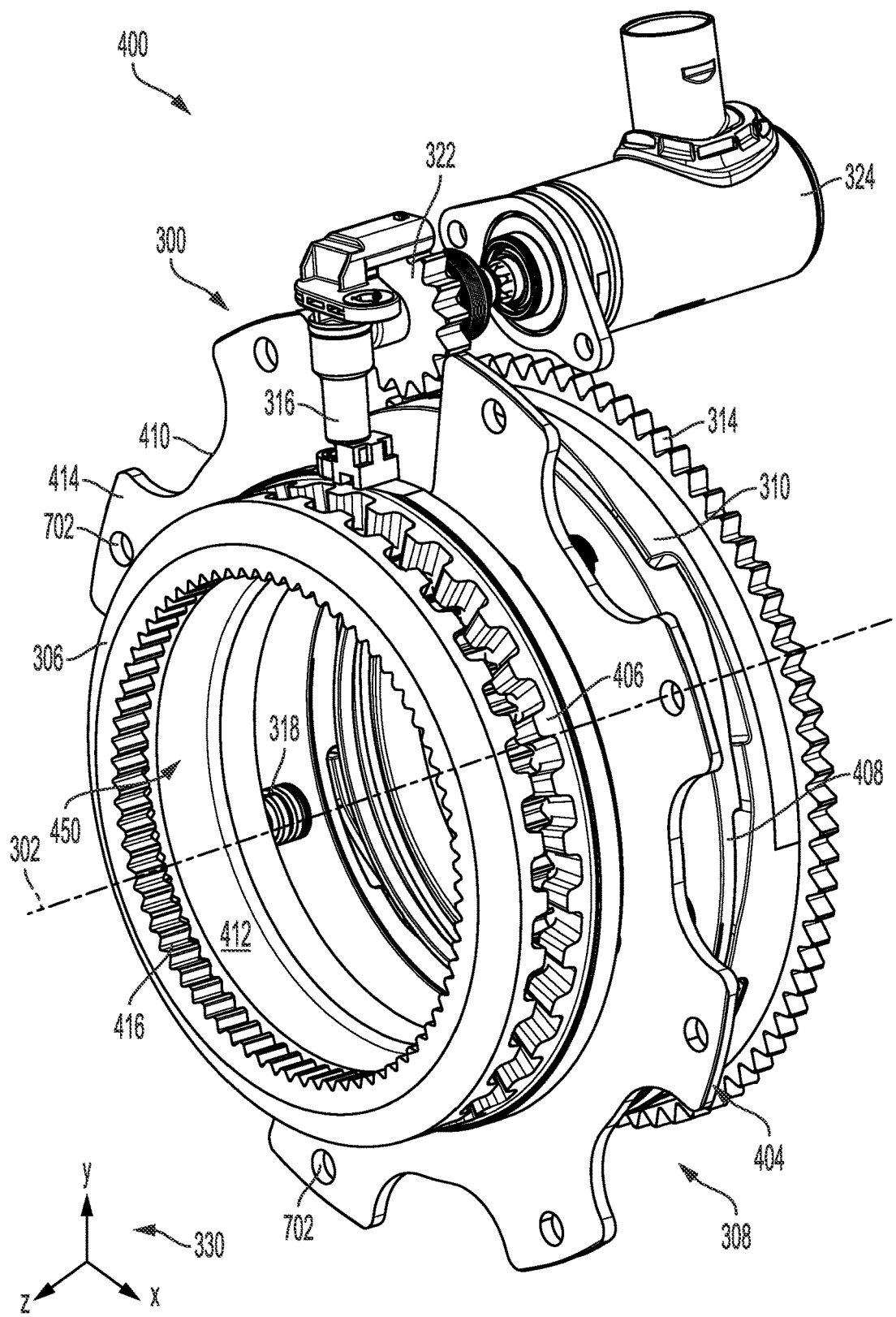
FIG. 4 shows a perspective view of a park lock, which may be an embodiment of the park lock of FIGS. 3A and 3B.
Figure 6:
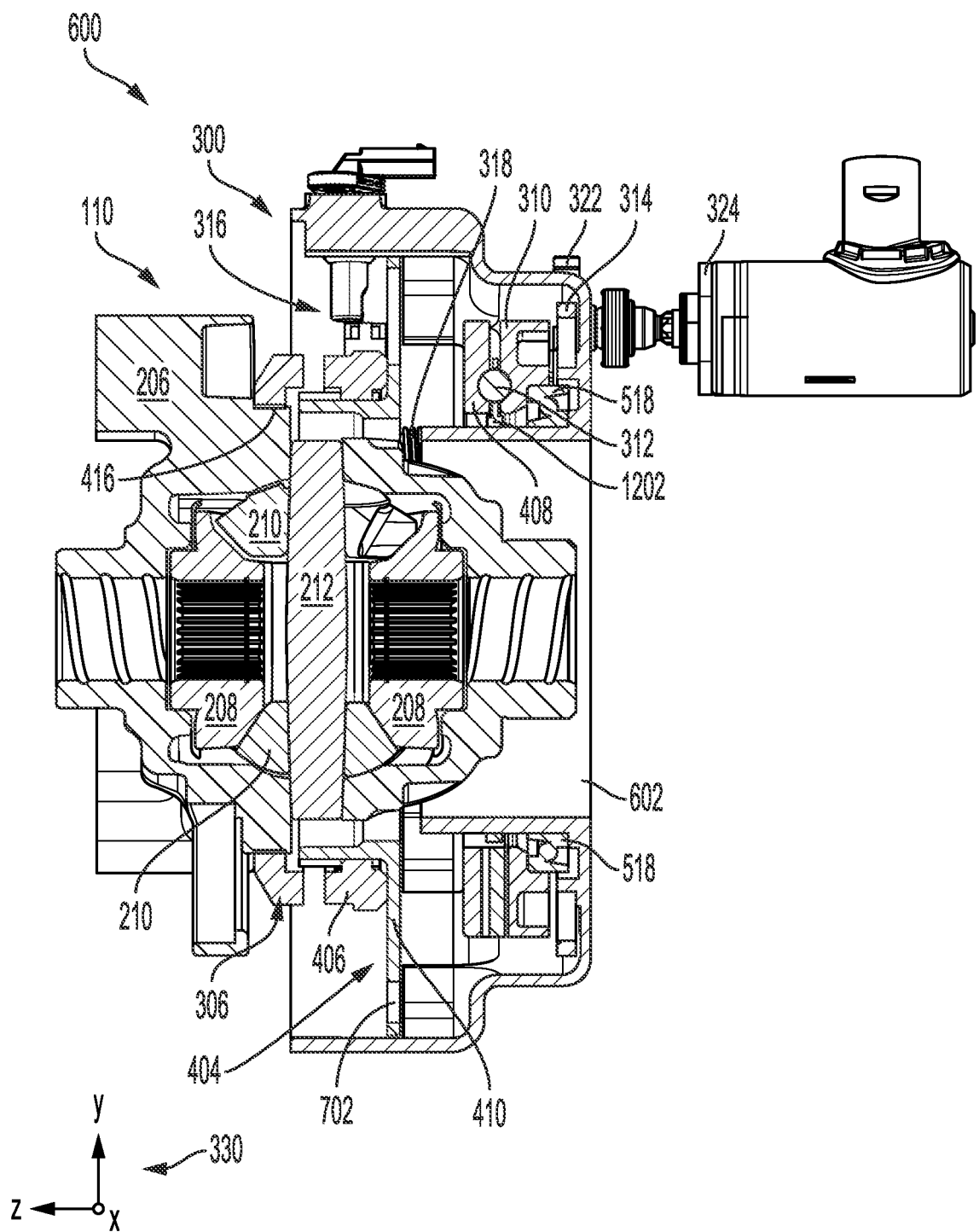
FIG. 6 shows a cross-sectional view of the park lock coupled to a differential.

The first face 315 of the sprocket 306 faces the pawl assembly 308 and a second face 319, as well as an inner surface, as shown in FIG. 4, of the sprocket 306 may be fixedly coupled to the differential casing 206. For example, the sprocket 306 may circumferentially surround a portion of the differential casing 206, as shown in FIG. 6. The sprocket 306 does not move, either axially or radially, relative to the differential casing 206 and may be secured thereto by a variety of methods, including welding, fasteners, a press-fit engagement, etc.

Figure 16:
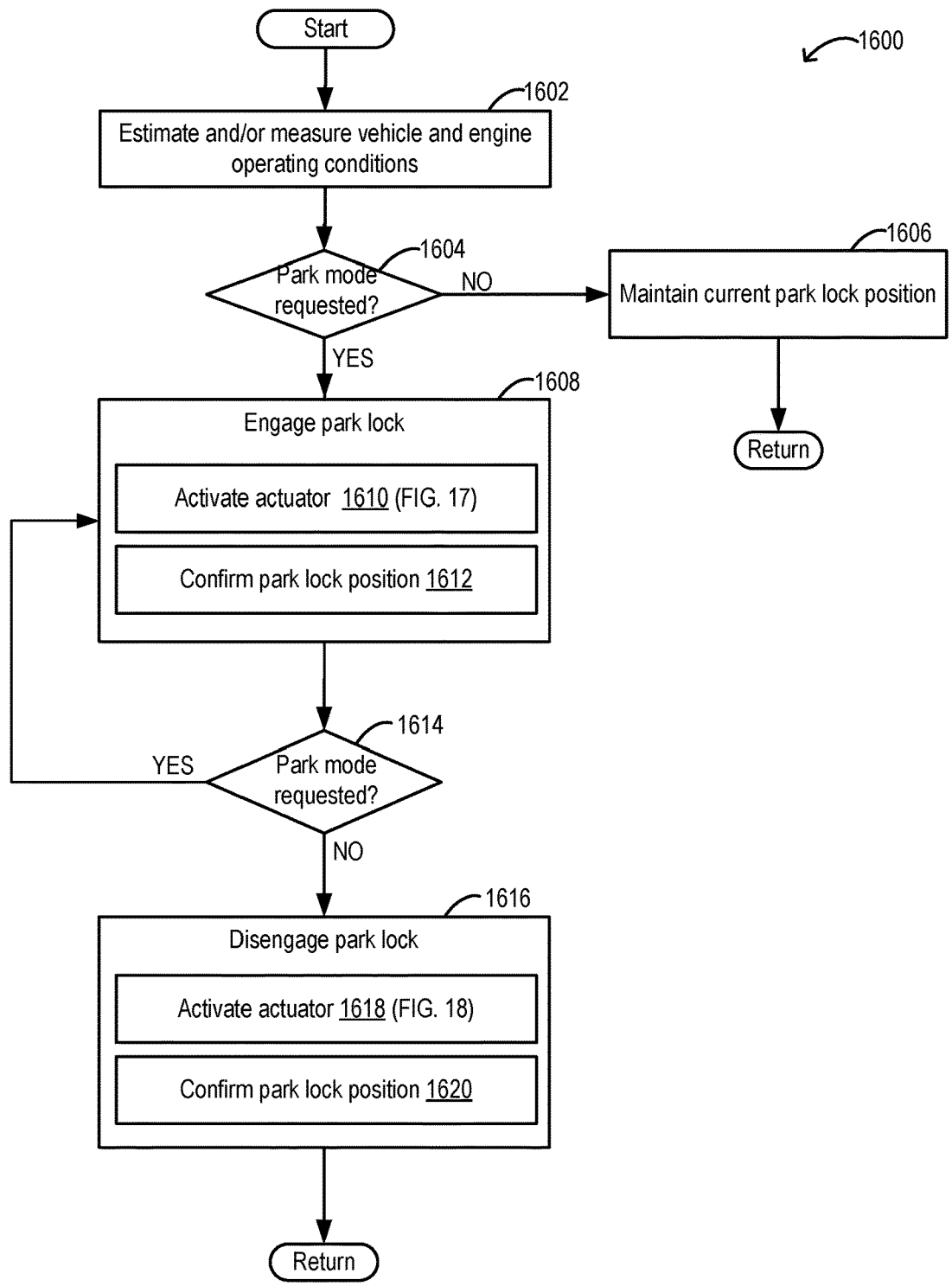
FIG. 16 shows an example of a method for operating the park lock.
Figure 17:
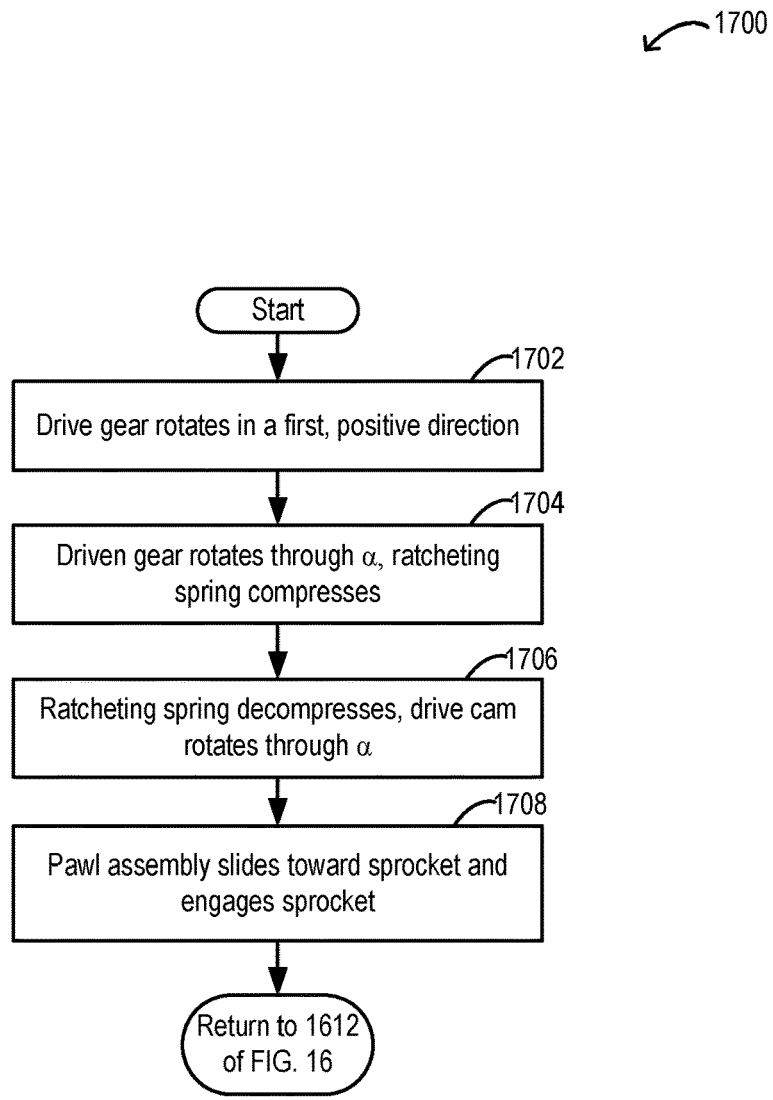
FIG. 17 shows a first routine for engaging the park lock.
Figure 18:
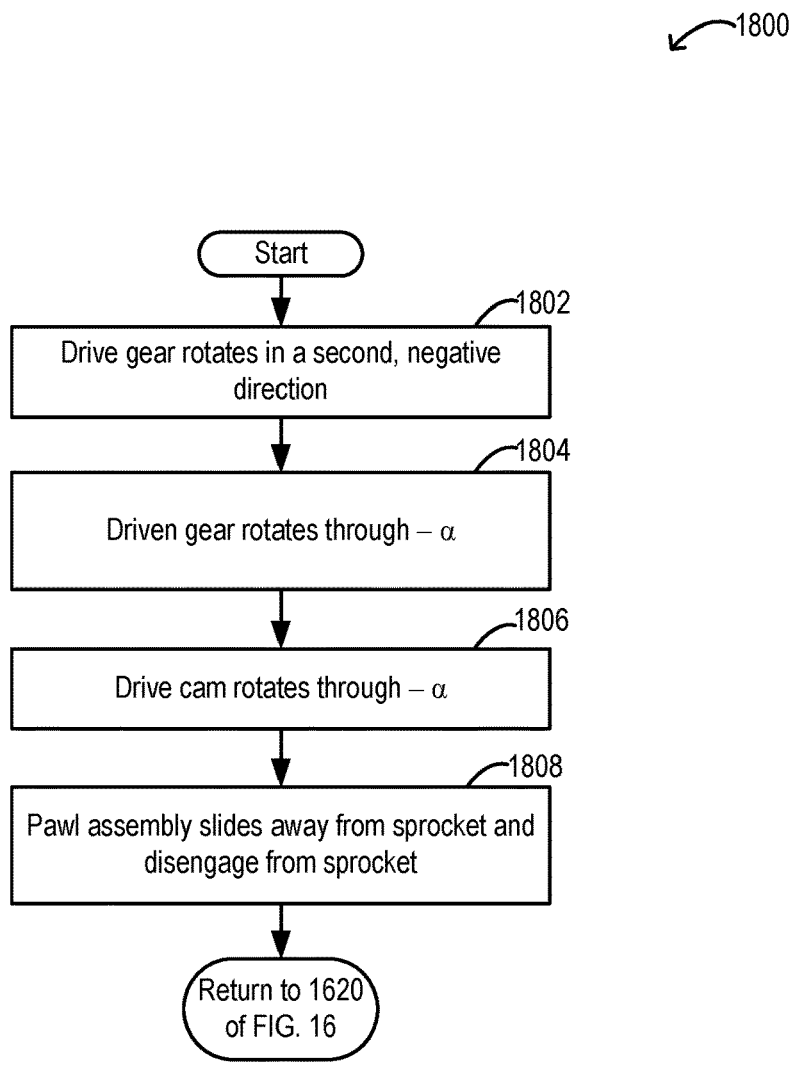
FIG. 18 shows a second routine for disengaging the park lock.

An example of a method 1600 for operating a park lock, e.g., the park lock 300 of FIGS. 3A-3B, of a vehicle is depicted in FIG. 16 and examples of a routine 1700 for engagement of the park lock and a routine 1800 for disengagement of the park lock are shown in FIGS. 17-18, respectively. Instructions for carrying out method 1600 may be executed by a controller, such as controller 126 of FIG. 1, based on instructions stored on a memory of the controller and in conjunction with signals received from sensors of a vehicle, such as the sensors described above with reference to FIG. 1. Method 1600 and the routines 1700 and 1800 are described with reference to FIGS. 3A-3B to illustrate motions and relative positioning during operation of the park lock.

At 1602, method 1600 includes estimating and/or measuring current vehicle and engine operating conditions. For example, a status of the engine (e.g., on or off), a status of an electric machine of the vehicle, vehicle speed, torque demand, etc. may be determined. Method 1600 includes confirming if a park mode is requested at 1604. For example, when the vehicle is being driven, e.g., a transmission of the vehicle is adjusted to a non-park mode via an operator-controlled gear box, the park lock 300 of FIGS. 3A-3B may in the first, disengaged position 301 of FIG. 3A. In the first position 301, the plurality of teeth 356 of the pawl assembly 308 is spaced away from the plurality of teeth 358 of the sprocket 306. The sprocket 306 and the differential casing 206 may spin in unison as driven by rotation of a pinion drive gear, such as the pinion drive gear 202 of FIG. 2. The actuator 324 may be deactivated and the second portion 370 of the park lock 300 may be stationary. The jounce springs 318 and the ratcheting spring 320 are not compressed.

The request for the park mode may be indicated by adjustment of the vehicle to the park mode via the gear box, as performed by the operator. If the park mode is not requested, method 1600 proceeds to 1606 to continue vehicle operation with the park lock in the disengaged position, e.g., the first position 301 of FIG. 3A. Method 1600 returns to the start.

If the request for the park mode is detected, method 1600 continues to 1608 to engage the park lock, e.g., adjust the park lock 300 to the second position 303 of FIG. 3B. Engaging the park lock may include activating an actuator at 1610. Further details of engaging the park lock upon activating the actuator are provided in routine 1700 of FIG. 17.

At 1702, routine 1700 includes rotating a drive gear in a first direction (e.g., a positive direction). For example, as shown in FIGS. 3A-3B, the actuator 324 may be energized to turn the drive gear 322, which may engage the driven gear 314. At 1704 of routine 1700, the driven gear 314 rotates by an angle α, as indicated in FIG. 3A, about the central axis of rotation 302. In one example, the angle α may be a rotation of 30 degrees. In other examples, the angle α may be between 20 degrees and 60 degrees. When rotation of the driven gear 314 through the angle α is complete, the actuator 324 may be de-energized which may lock a position of the drive gear 322 and therefore, lock a position of the driven gear 314. In one example, the angle α may be a pre-set angle and activation of the actuator 324 when the park lock is in the first position 301 of FIG. 3A may automatically cause the actuator 324 to rotate the drive gear 322 by an amount that turns the driven gear 314 by the angle α.

Rotation of the driven gear 314 may exert a compressive force on the ratcheting spring 320, e.g., via the detent of the driven gear 314 pushing on a first end of the ratcheting spring 320 in a radial direction. The resistant spring force of the ratcheting spring 320 may drive an expansion of the ratcheting spring 320, and at 1706 of routine 1700, the expansion causes a second end of the ratcheting spring 320 to decompress and extend away from the detent of the driven gear 314. Since the ratcheting spring 320 is embedded in the furrow, the extension of the ratcheting spring 320 may drive rotation of the drive cam 310, as shown at 1706 of routine 1700, also by the angle α due to the second end of the ratcheting spring 320 abutting and pushing against an end of the furrow. Further details of the ratcheting spring, the furrow and relative compression and expansion of the ratcheting spring are provided below, with reference to FIG. 15.

As the drive cam 310 rotates, the ball 312 may travel around the central axis of rotation 302, in the direction of rotation by the angle α, as shown in FIG. 3A, along the grooves of the first face 313 of the pawl assembly 308 and the second face 307 of the drive cam 310, relative to the view shown in FIG. 3A. The varying thickness of the profile of the drive cam 310 at the second face 307, where, for example, the thickness 352 of the drive cam 310 is reduced at the first region 307a relative to the third region 307c, may exert a force on the pawl assembly 308 as the drive cam 310 rotates. Prior to 1706 of routine 1700, a first pair of regions including the third region 307c of the drive cam 310 and the third region 313c of the pawl assembly 308 are aligned with one another along the central axis of rotation 302, and a second pair of regions including the first region 307a of the drive cam 310 and the first region 313a of the pawl assembly 308 are also aligned with one another along the central axis of rotation 302, as shown in FIG. 3A. At 1706 of routine 1700, the rotation by the angle α of the drive cam 310 shifts the position of the regions 307a, 307c, 313a, and 313b to the positions shown in FIG. 3B.

The change in the profile of the second face 307 of the drive cam 310 forces the position of the ball 312 within the park lock 300 to be shifted by a distance 362 to the left when the park lock is in the second position 303 of FIG. 3B. The ball 312 rolls along the grooves of the first face 313 of the pawl assembly 308 and the second face 307 of the drive cam 310 to transmit the rotational motion of the drive cam 310 to an axial motion of the pawl assembly 308.

The movement of the ball 312 exerts a force on the pawl assembly 308 in the direction indicated by arrow 311a in FIG. 3A. At 1708 of routine 1700, the movement of the ball 312 drives sliding of sub-components of the pawl assembly 308 in the same direction and adjusting the park lock to the second position 303 of FIG. 3B. In the second position 303, the jounce springs 318 may be compressed between the sub-components of the pawl assembly 308, e.g., the pawl-driven cam and the stationary park lock frame. The plurality of teeth 356 of the pawl assembly 308 may mesh with the plurality of teeth 358 of the sprocket 306. As a result, the differential casing 206 may be locked to the axle housing and unable to rotate. Routine 1700 returns to 1612 of method 1600.

At 1612, method 1600 includes confirming a position of the park lock. For example, as shown in FIGS. 3A-3B, a position of the pawl assembly 308 may be monitored by a position sensor 316, which may be similar to the position sensor 122 of FIG. 1. The position sensor 316 may be positioned proximate to the park lock and attached to an axle housing, as one example. For example, the position sensor 316 may be magnetically operated and configured to interact with a magnet coupled to the pawl assembly to determine a relative position of the pawl assembly 308.

In some instances, the differential casing 206 may be stopped in a position where the plurality of teeth 358 of the sprocket 306 is misaligned relative to the plurality of teeth 356 of the pawl assembly 308 such that tooth-on-tooth contact occurs when the park lock 300 is adjusted to the second position 303 of FIG. 3B, for example. In other words, the plurality of teeth 356 of the pawl assembly 308 and the plurality of teeth 358 of the sprocket 306 are unable to interlock or mesh. This instance of tooth-on-tooth (e.g., non-gear meshing) may be addressed by the park lock 300 in a manner consistent with conventional park locks, such as mechanical ratcheting.

If the park mode is requested when the vehicle speed is greater than 0 mph but less than a threshold speed, (e.g., 2 mph) and other vehicle and engine operating conditions are such that the vehicle is adjustable to the park mode, the routine 1700 may be implemented. If the vehicle speed is greater than the threshold speed, the rotating part of the vehicle may still be rotating while the routine 1700 is being implemented. At 1708 of the routine 1700, the sprocket 306 may therefore be rotating when the vehicle speed is greater than the threshold speed. The plurality of teeth 356 of the pawl assembly 308 may have tooth-on-tooth interference with the plurality of teeth 358 of the sprocket 306 as the plurality of teeth attempt to mesh. The plurality of teeth 358 of the sprocket 306 may therefore exert a force on the plurality of teeth 356 of the pawl assembly 308. The force may pass through the ball 312 in the direction of the arrow 311b and exert a force on the drive cam 310, which may compel the drive cam 310 to rotate through the angle −α.

However, since the driven gear 314 is locked in place by the actuator 324, rotation of the drive cam 310 along −α, as compelled by the pawl assembly 308 through the ball 312, causes the ratcheting spring 320 to compress. Compression of the ratcheting spring 320 against the locked driven gear 314 may provide resistance to the axial sliding of the pawl assembly 308 away from the sprocket 306 (e.g., as indicated by arrow 311b) due to the stiffness of the ratcheting spring 320. The force of the jounce springs 318 may be too low compared to the stiffness/spring force of the ratcheting spring 320 to influence axial sliding of the pawl system 308 during mechanical ratcheting. The greater stiffness/spring force of the ratcheting spring 320 causes the pawl assembly 308 to push again against the sprocket 306 as shown by arrow 311a. This ratcheting may continue until a speed of the differential 206, and therefore the sprocket 306, is low enough to permit the engagement/meshing of the plurality of teeth 358 of the pawl 306 with the plurality of teeth 356 of the pawl 308. The mechanical ratcheting may occur when the park mode is requested while the vehicle is on an incline (and accelerating) or when the vehicle is decelerating and the vehicle speed is below the speed threshold required to engage the park lock.

At 1614, method 1600 includes confirming if the park mode is requested. For example, the controller may determine if the gear box remains in the park mode or if the gear box is adjusted out of the park mode by the operator. If the park mode is still requested, e.g., no adjustment to the gear box is made, method 1600 returns to 1608. If the park mode is no longer requested, e.g., the gear box is shifted to a different gear mode, method 1600 proceeds to 1616 to disengage the park lock.

Disengaging the park lock may include, for example, activating the actuator 324 to transition the park lock 300 of FIGS. 3A-3B from the second position 303 of FIG. 3B to the first position 301 of FIG. 3A as shown in routine 1800 of FIG. 18. At 1802 of routine 1800, the actuator turns the drive gear in a second direction opposite of the first direction (e.g., a negative direction). As the drive gear turns in the second direction, the driven gear is forced to also rotate in the second direction at 1804. For example, as indicated in FIG. 3B, the drive gear 322 may rotate the driven gear 314 through the angle α in the opposite direction relative to FIG. 3A, e.g., −α. Rotation of the driven gear 314 through −α may cause the detent of the driven gear 314 to push against an end of the furrow in the drive cam 310, e.g., in a rotational direction away from the first end of the ratcheting spring 320, driving rotation of the drive cam 310 through −α. As such, routine 1800 includes rotating the drive cam 310 through −α at 1806.

When the drive gear turns through an amount of rotation that causes the driven gear to rotate through −α, the actuator may be deactivated, e.g., de-energized, thereby locking the position of the drive gear and the driven gear. As described above, the actuator may automatically rotate the drive gear through −α when the actuator is activated and the park lock is engaged, e.g., in the second position 303 of FIG. 3B.

As the drive cam 310 rotates through −α, the ball 312 travels in a direction opposite from the description above, returning to the position shown in FIG. 3A. As a result, the pawl assembly 308 disengages from the sprocket 306 at 1808 of routine 1800. For example, the force exerted on the pawl assembly 308 (e.g., in the direction indicated by arrow 311a of FIG. 3A) is alleviated and decompression of the jounce springs 318 pushes the pawl assembly to slide to the right, maintaining contact with the ball 312, as indicated by arrow 311b of FIG. 3B, and thereby returning the park lock 300 to the first position 301 of FIG. 3A. Routine 1800 returns to 1620 of FIG. 16.

At 1620 of method 1600, the position of the park lock may be confirmed based on a signal from the position sensor, e.g., the position sensor 316 of FIGS. 3A-3B. Confirmation may depend on the distance between the position sensor and the magnet coupled to the pawl assembly reaching a second target distance, the second target distance greater than the first target distance. For example, if the distance is determined to be less than the second target distance, the controller may command activation of an alert, such as a message displayed at the dashboard display or illumination of the MIL to indicate an issue with the park lock. Method 1600 returns to the start.

When adjusted to the second, engaged position 303 of FIG. 3B, the park lock 300 may be stabilized in the second position 303 and therefore unable to unintentionally adjust to the first, disengaged position 301 without activation of the actuator 324. For example, in the second position 303, sliding of the pawl assembly 308 away from the sprocket 306, e.g., as indicated by arrow 311b, is inhibited by the alignment of the third region 307c of the second face 307 of the drive cam 310 with the first region 313a of the first face 313 of the pawl assembly 308 in a direction parallel with the central axis of rotation 302. The deactivated actuator 324 may hold the drive cam 310 in place, impeding reverse rotation of the drive cam 310 as well as sliding of the ball 312 along the second region 307b of the second face 307 of the drive cam 310 in a downwards direction (with respect to the view shown in FIG. 3B).

When adjusted to the first, disengaged position 301 as shown in FIG. 3A, the jounce springs 318 may stabilize the second portion 370 of the park lock 300 and inhibit unintentional engagement of the second portion 370 with the first portion 360. In the first position 301, a stiffness of the jounce springs 318 pushes the sub-components (e.g., the pawl and the pawl-driven cam) of the pawl assembly 308 against the drive cam 310, with the ball 312 therebetween. The drive cam 310 is again locked in place by the deactivated actuator 324 and cannot rotate. The pawl assembly 308 is thereby maintained stationary and spaced away from the sprocket 306.

Turning to FIGS. 4-6, a perspective view 400 and an exploded view 500 of the park lock 300 of FIGS. 3A-3B are shown in FIGS. 4 and 5, respectively, and a cross-section 600 of the park lock 300 implemented at the differential 110 of FIGS. 1 and 2 is depicted in FIG. 6. Components previously shown in FIGS. 3A-3B are similarly numbered and will not be re-introduced for brevity. A set of reference axes 330 is provided for comparison between views, indicating a y-axis, an x-axis, and a z-axis. In some examples, the y-axis may be parallel with a direction of gravity (e.g., a vertical direction), the x-axis parallel with a horizontal direction, with the z-axis perpendicular to both the y-axis and the x-axis. A central passage 450 extends entirely through the park lock 300 along the central axis of rotation 302.

The sub-components of the pawl assembly 308 are shown in FIG. 4 which may include a park lock frame 404, a pawl 406, a pawl-driven cam 408, and the jounce springs 318, amongst other components. The park lock frame 404 may have a diameter 502, as indicated in FIG. 5, that is larger than diameters of the other components of the park lock 300 and includes a plate 410 and a hub 412. The park lock frame 404 may be a single continuous structure, e.g., the plate 410 and the hub 412 may be continuous with one another. The plate 410 is planar and oriented perpendicular to the central axis of rotation 302 and the hub 412 protrudes from a surface of the plate 410 facing the sprocket 306 along the central axis of rotation 302. A distance 504 the hub 412 extends along the central axis of rotation 302, from the plate 410 towards the sprocket 306, may be greater than a depth 506 of the pawl 406. Furthermore, an outer surface of the hub 412 may be modified to with spline teeth, as shown in FIG. 5.

Figure 7:
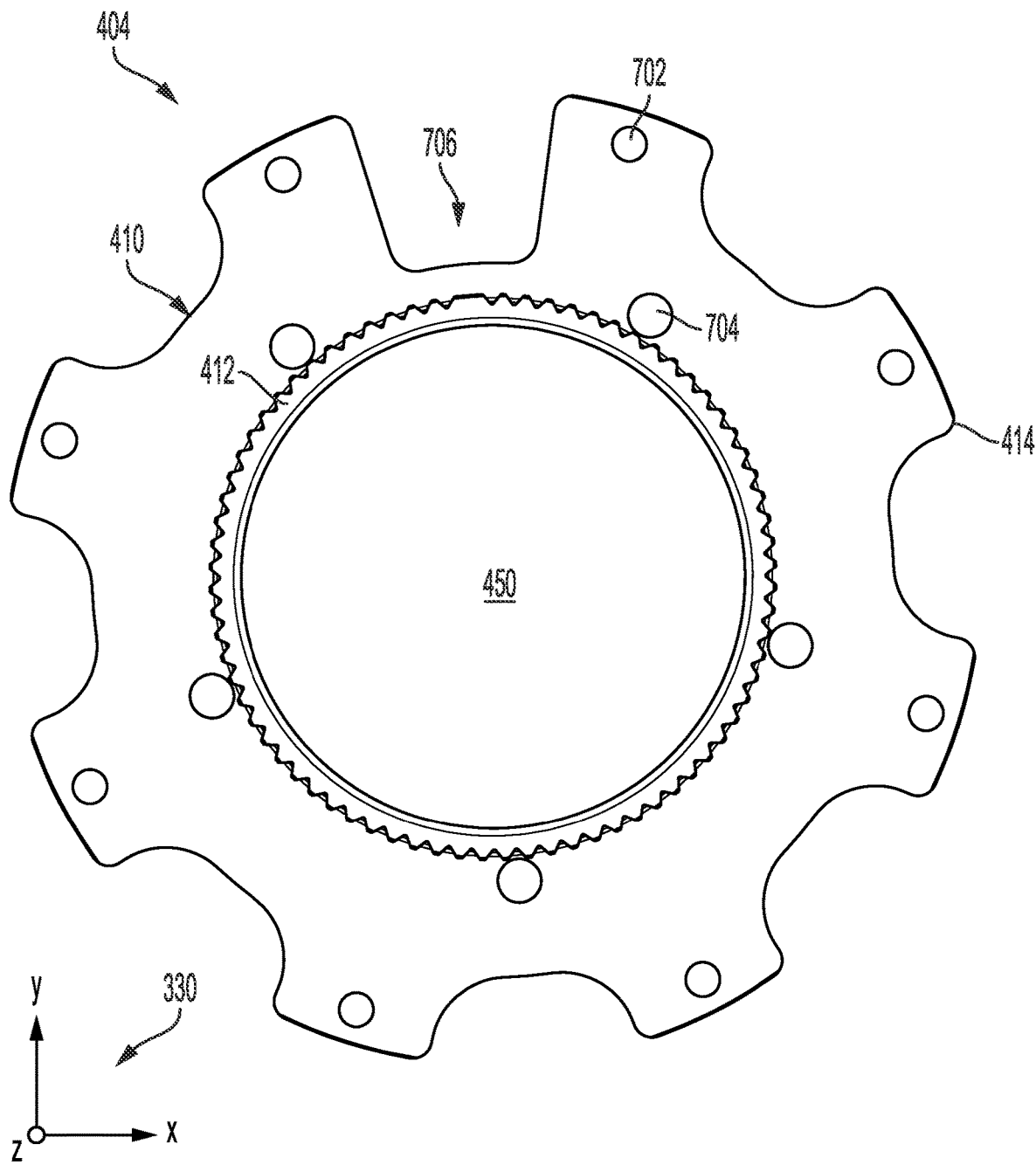
FIG. 7 shows a front view of a park lock frame of the park lock of FIG. 4.

A front view of the park lock frame is shown in FIG. 7, illustrating an outer geometry of the plate 410 which includes a plurality of cogs 414, as shown in FIG. 4, arranged evenly spaced apart along a perimeter of the plate 410. Each of the plurality of cogs 414 may include a first set of apertures 702 through which a fastener, such as screws or bolts, may be inserted to secure the park lock frame 404 to an axle housing 602, as shown in FIG. 6. The park lock frame 404 is thereby fixedly coupled to the axle housing 602 and maintained stationary regardless of a status of the park lock 300.

Returning to FIG. 7, the park lock frame 404 may include a second set of apertures 704 proximate to and arranged evenly spaced apart around the hub 412. The second set of apertures 704 may have larger diameters than the first set of apertures 702 and may be configured to receive tubes 512, as shown in FIGS. 5 and 8 and described further below. The diameters of the second set of apertures 704 may be wide enough to allow the tubes 512 to slide axially through the second set of apertures 704 uninhibited but narrower than a diameter of the jounce springs 318. The park lock frame 404 may further include a cut-out 706 at an upper region of the plate 410 of the park lock frame 404 to accommodate a positioning of the position sensor 316, as shown in FIGS. 4 and 6.

The pawl 406 may be coupled to the hub 412 of the park lock frame 404 such that the pawl 406 circumferentially surrounds the hub 412, as shown in FIGS. 4 and 6, and an inner surface 802 of the pawl 406, as shown in FIG. 8, may be in face-sharing contact with the outer surface of the hub 412. Turning briefly to FIG. 8, a portion of the pawl assembly 308 is illustrated, including the pawl 406. The inner surface 802 of the pawl 406 includes spline teeth which may be configured to mesh with the spline teeth of the outer surface of the hub 412 of the park lock frame 404. When the pawl 406 is coupled to the hub 412, the meshing of the respective spline teeth allows axial motion of the pawl 406 relative to the park lock frame 404 but not radial motion. The pawl 406 may be configured to slide along the hub 412 without becoming decoupled from the hub 412 when the park lock 300 is adjusted between the first position 301 and the second position 303 of FIGS. 3A and 3B, respectively.

Returning to FIGS. 4-6, the pawl 406 may be a ring that interfaces with the sprocket 306 and includes the second face 317 of the pawl assembly 308 as well as the plurality of teeth 356. A face 508 of the pawl 406 opposite of the second face 317 of the pawl assembly 308 may be planar (hereafter the planar face 508 of the pawl 406) and configured to be in face-sharing contact with a surface of the plate 410 of the park lock frame 404 when the park lock 300 is in the first position 301 of FIG. 3A.

The pawl-driven cam 408 may be positioned on an opposite side of the park lock frame 404 from the pawl 406 and includes the first face 313 of the pawl assembly 308. As shown in FIG. 5, a face 510 of the pawl-driven cam 408 opposite of the first face 313 may be planar (hereafter, the planar face 510 of the pawl-driven cam 408). The pawl-driven cam 408 may be spaced away from the park lock frame 404 by the tubes 512 extending between the pawl-driven cam 408 and the plate 410 of the park lock frame 404. The park lock 300 is depicted herein with five of the tubes 512 but a quantity of the tubes 512 may vary in other examples. The tubes 512 may be rigid cylindrical structures fixedly coupled at a first end of each of the tubes 512 to the planar face 510 of the pawl-driven cam 408 such that the tubes 512 do not move relative to the pawl-driven cam 408.

Figure 9:
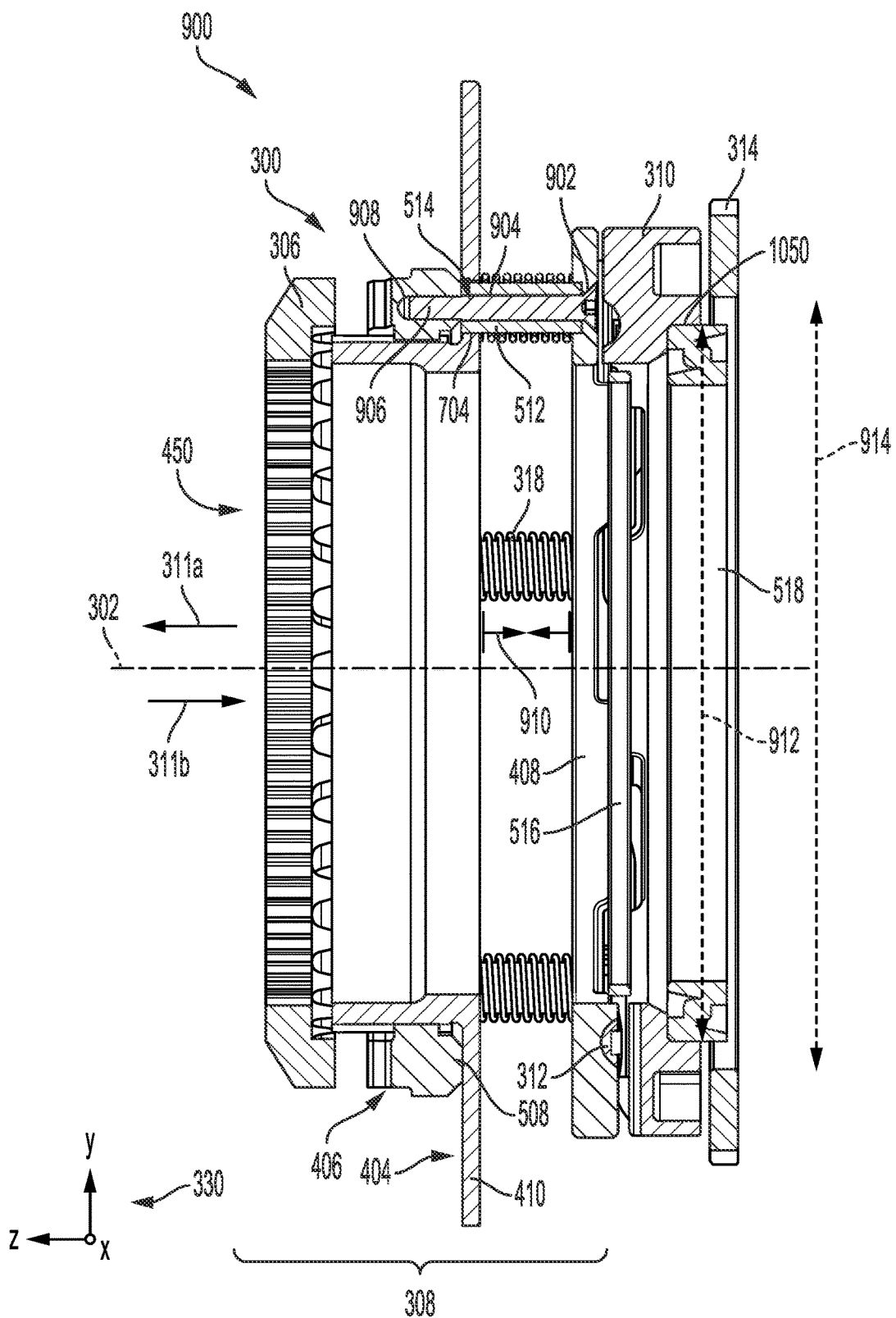
FIG. 9 shows a cross-sectional view of the park lock.

At a second end of each of the tubes 512, the tubes 512 may be inserted through the second set of apertures 704 (as shown in FIG. 7) of the park lock frame 404 and fixedly coupled to the planar face 508 of the pawl 406. A configuration of the tubes 512 relative to the pawl-driven cam 408 and the pawl 406 is illustrated in FIGS. 8 and 9. The tubes 512 thereby couple the pawl-driven cam 408 to the pawl 406 such that the pawl-driven cam 408 and the pawl 406 move as a single unit.

As shown in FIG. 9 in a cross-section 900 of the park lock 300, bolts 514 may be inserted through through-holes 902 in the pawl-driven cam 408 corresponding to locations of the tubes 512, and through a central passage 904 of each of the tubes 512. A threaded end 906 of each of the bolts 514 may, for example, engage with threading in blind-holes 908 disposed in the planar face 508 of the pawl 406. A positioning of the blind-holes 908 may correspond to the positioning of the through-holes 902 in the pawl-driven cam 408. The bolts 514 thus extend from the first face 313 of the pawl assembly 308, through the through-holes 902 in the pawl-driven cam 408, through the central passages of the tubes 512, through the second set of apertures 704 of the park lock frame 404 and into the blind-holes 908 of the pawl-driven cam 408. By engaging the threading of the bolts 514 with the threading in the blind-holes 908 of the pawl 406 and tightening the bolts 514, the pawl-driven cam 408 may be secured to the pawl 406 and together may slide axially relative to the park lock frame 404. For example, in FIG. 9 the park lock 300 is depicted in the first position 301 of FIG. 3A. The pawl-driven cam 408, the tubes 512, and the pawl 406 may slide in the direction indicated by arrow 311a when the park lock 300 is adjusted to the second position 303 of FIG. 3B. As the tubes 512 slide through the second set of apertures 704 of the park lock frame 404 and the pawl-driven cam 408 moves closer to the park lock frame 404, the jounce springs 318 become compressed between the park lock frame 404 and the pawl-driven cam 408, as indicated by arrows 910 in FIG. 9.

The jounce springs 318 remain compressed while the park lock 300 is in the second position 303 of FIG. 3B. Upon disengagement of the park lock 300, e.g., adjustment to the first position 301 of FIG. 3A, the force exerted on the pawl assembly 308 by the drive cam 310 in the direction indicated by arrow 311a is removed. The spring force of the jounce springs 318 cause decompression and return of the jounce springs 318 to their expanded configuration. As the jounce springs 318 expand, the jounce springs 318 push the pawl-driven cam 408 in the direction indicated by arrow 311b. The pawl-driven cam 408 slides away from the park lock frame 404, pulling the tubes 512 through the second set of apertures 704 of the park lock frame 404 and pulling the pawl 406 away from the sprocket 306.

As described above, the plurality of teeth 356 of the pawl 406 may mesh with the plurality of teeth 358 of the sprocket 306 when the park lock 300 is adjusted to the second position 303 of FIG. 3B. As shown in FIG. 4, an inner surface 416 of the sprocket 306 may be adapted with spline teeth. A region of the differential casing 206 to which the sprocket 306 is fixedly coupled, as shown in FIG. 6, may be similarly configured with spline teeth. As such, when the inner surface 416 is in face-sharing contact with the region of the differential casing 206 adapted with the spline teeth, the sprocket 306 may fit tightly around the region of the differential casing 206, maintaining the sprocket 306 in place and stationary.

As illustrated in FIG. 6, the sprocket 306 may be the only component of the park lock 300 fixedly coupled to the differential casing 206 such that the sprocket 306 rotates in unison with the differential casing 206. The differential casing 206 may be at least partially positioned within the central passage 450 of the park lock 300 and may spin within the central passage 450 when the park lock is disengaged (e.g., adjusted to the first position 301 of FIG. 3A). The park lock 300 (with the exception of the drive gear 322 and the actuator 324) and the differential casing 206 may be entirely enclosed within the axle housing 602. It will be appreciated that only a section of the axle housing 602 is shown in FIG. 6 for brevity.

The actuator 324 and the drive gear 322 may be positioned external to the axle housing 602. The drive gear 322 may engage with the driven gear 314 through an opening in the axle housing 602. The driven gear 314 and the drive cam 310 may rotate within the axle housing 602 and do not contact the differential casing 206. As described above, the drive cam 310 is spaced away from the pawl-driven cam 408 with the ball 312 (e.g., plurality of balls 312) arranged in between. As shown in FIG. 8, each ball 312 may be positioned within a groove 804 of the pawl-driven cam 408 in the first face 313 of the pawl assembly 308. The groove 804 extends along the set of regions of the first face 313, including the first region 313a, the second region 313b, and the third region 313c, and has a first end 806 in the first region 313a and a second end 808 in the third region 313c. Furthermore, each repetition of the set of regions of the first face 313 of the pawl assembly 308 may be spaced apart from adjacent sets of regions by plateau sections 810. At the plateau sections 810, a thickness of the pawl-driven cam 408 (the thickness defined along the central axis of rotation 302) may be reduced relative to the set of regions. The thickness of the pawl-driven cam 408 may be uniform throughout the plateau sections 810 and the plateau sections 810 may have planar surfaces, e.g., parallel with the y-axis. The through-holes 902 of the pawl-driven cam 408 for receiving the bolts 514 may be disposed in the plateau sections 810.

Turning briefly to FIG. 10A, which depicts the second face 307 of the drive cam 310 in detail, the ball 312 may also be positioned within a track 1002 in the second face 307 of the drive cam 310. The track 1002 extends along the first region 307a, the second region 307b, and the third region 307c of the set of regions of the second face 307 and has a first end 1004 in the first region 307a and a second end 1006 in the third region 307c. Similar to the pawl-driven cam 408, the sets of regions are spaced apart from one another around a circumference of the second face 307 of the drive cam 310 by plateau sections 1008. The thickness, e.g., the thickness 352 indicated in FIGS. 3A and 3B, of the drive cam 310 is reduced at the plateau sections 1008 relative to the sets of regions. In addition, the plateau sections 1008 may have planar surfaces, e.g., parallel with the y-axis.

When the park lock 300 is in the first position 301 of FIG. 3A, the pawl-driven cam 408 and the drive cam 310 may be oriented relative to one another such that a distance between the pawl-driven cam 408 and the drive cam 310 is minimized. For example, as shown by FIG. 11 in a cut-away view 1100 of the park lock 300, where the park lock 300 is in the first position 301 of FIG. 3A, the third region 313c of the first face 313 of the pawl assembly 308 (and of the pawl-driven cam 408) may be aligned with the first region 307a of the second face 307 of the drive cam 310 along the z-axis. The first region 313a and the second region 313b of the pawl-driven cam 408 may be aligned with one of the plateau sections 1008 of drive cam 310. The second region 307b and the third region 307c of the drive cam 310 may be aligned with one of the plateau sections 810 of the pawl-driven cam 408. The ball 312 is sandwiched between the pawl-driven cam 408 and the drive cam 310 along the z-axis and sandwiched between the second end 808 of the groove 804 of the pawl-driven cam 408 and the first end 1004 of the track 1002 of the drive cam 310.

Rotation of the drive cam 310 through the angle α, e.g., clockwise rotation of the drive cam when viewing the park lock 300 along the central axis of rotation 302 in a direction from the driven gear 314 to the sprocket 306, compels the ball 312 to roll up, as indicated by arrow 1102. As the ball 312 rolls up, the ball 312 travels along the groove 804 of the pawl-driven cam 408 until the ball 312 reaches the first end 806 of the groove 804. Upon reaching the first end 806 of the groove 804, the ball 312 may no longer move relative to the pawl-driven cam 408.

The ball 312 also travels along the track 1002 of the drive cam 310 as the ball 312 rolls upwards during rotation of the drive cam 310, from the first end 1004 to the second end 1006 of the track 1002. When rotation of the drive cam 310 through the angle α is complete, the third region 307c of the drive cam 310 is aligned with the first region 313a of the pawl-driven cam 408, with the ball 312 position in between. The protrusion and increased thickness of the drive cam at the third region 307c forces the pawl assembly 308 to slide towards the sprocket 306 in the direction indicated by arrow 311a. When the park lock 300 is returned to the first position 301 of FIG. 3A and FIG. 11, the ball 312, the pawl-driven cam 408, and the drive cam 310 return to the arrangement depicted in FIG. 11.

Returning to FIG. 5, in addition to the ball 312, the pawl-drive cam 408 and the drive cam 310 may also be spaced apart by a gasket 516. The gasket 516 is shown in FIG. 12 in a view of the park lock 300 with the driven gear 314 and the drive cam 310 omitted, illustrating details of the first face 313 of the pawl-driven cam 408. The gasket 516 may be a ring formed of a more flexible material than each of the pawl-driven cam 408 and the drive cam 310.

The gasket 516 includes ball cages 1202 protruding outwards from the gasket 516, e.g., away from the central axis of rotation 302. The ball cages 1202 may be continuous with the gasket 516 and may each be a ring with an inner diameter similar to a diameter of the balls 312. Each ball 312 may be circumferentially surrounded by one of the ball cages 1202 along the y-axis, as shown in FIGS. 6 and 11. The gasket 516 and the ball cages 1202 may thereby stabilize radial motion of the ball 312, e.g., movement of the ball along the groove 804 of the pawl-driven cam and the track 1002 of the drive cam 310.

Turning again to FIG. 5, the park lock 300 may also include a ball bearing 518 which may be a ring supporting a plurality of balls. The plurality of balls of the ball bearing 518 are illustrated in FIGS. 6 and 9. The ball bearing 518 may be nested within the first face 305 of the drive cam 310, as shown in FIG. 9. For example, a detailed view of the first face 305 of the drive cam 310 is shown in FIG. 10B. The first face 305 has an indentation 1050 extending entirely around a circumference of the first face 305 of the drive cam 310, along an inner region of the first face 305. Along the indentation, the thickness of the drive cam 310 is reduced.

Returning to FIG. 9, a diameter 912 of the drive cam 310 at the indentation 1050 may be similar to an outer diameter of the ball bearing 518. Along the z-axis, the ball bearing 518 may protrude from the first face 305 of the drive cam 310 and at least a portion of a thickness of the ball bearing 518, the thickness defined along the z-axis, may be circumferentially surrounded by the driven gear 314. However, as shown in FIG. 9, the ball bearing 518 does not contact the driven gear 314 due to a larger inner diameter 914 of the driven gear 314 relative to the outer diameter 912 of the ball bearing 518.

As shown in FIG. 6, the ball bearing 518 may be fixedly coupled to the axle housing 602. For example, the ball bearing 518 may circumferentially surround and be attached to a portion of the axle housing 602, e.g., by welding, fasteners, etc. The ball bearing 518 thereby stabilizes rotation of the drive cam 310 along the y-axis and circumvents wobbling of the drive cam 310 while maintaining the position of the drive cam 310 between the pawl-driven cam 408 and the driven gear 314.

The first face 305 of the drive cam 310 may further include at least one furrow 1052, as shown in FIG. 10B. As described above, the ratcheting spring 320 is embedded in the first face 305 of the drive cam 310, within the furrow 1052 which may extend circumferentially along the first face 305. In the example of the drive cam 310 depicted herein, the first face 305 includes four furrows 1052. However, other examples may include different quantities of the furrows 1052. Each furrow 1052 extends circumferentially along approximately a quarter of the circumference of the drive cam, with sections of a material of the drive cam 310 separating the furrows 1052 from one another. The furrows 1052 may extend partially into the thickness of the drive cam 310 and have a depth 1054, e.g., along the z-axis, that is similar to a diameter of the ratcheting spring 320.

A positioning of the ratcheting spring 320 in the drive cam 310 is illustrated in FIG. 13. Therein, a view of a section of the park lock 300 is provided with the driven gear 314 omitted, showing details of the first face 305 of the drive cam 310. The ratcheting spring 320 is nested in one of the furrows 1052, extending along a portion of a length 1302 of the furrow 1052.

The shorter length of the pre-compressed ratcheting spring 320 compared to the length 1302 of the furrow 1052 may allow space for insertion of a protruding structure of the driven gear 314, e.g., a detent, in the remaining portion of the length 1302 of the furrow 1052. FIG. 14 shows a first surface 1402 of the driven gear 314, which includes a set of detents 1404, protruding away from the first surface 1402 along the z-axis. The example of the driven gear 314 of FIG. 14 includes a first detent 1404a and a second detent 1404b in the set of detents 1404. However, in other example, different quantities of detents may be included in the set of detents 1404, such as three or four. The first detent 1404a and the second detent 1404b may be arranged on opposite sides of the driven gear 314, e.g., positioned 180 degrees apart from one another. A distance 1406 that the set of detents 1404 protrude along the z-axis may be greater than the depth 1054 of the furrow 1052, as shown in FIG. 10B.

The driven gear 314 may be positioned adjacent to the drive cam 310 in the park lock 300 and oriented such that the set of detents 1404 are inserted into the furrows 1052 of the drive cam 310. For example, the park lock 300 is shown from a rear view 1500 with the driven gear 314 omitted in FIG. 15. A first ratcheting spring 320a may be inserted in a first furrow 1052a of the drive cam 310. Similarly, a second ratcheting spring 320b may be inserted in a second furrow 1052b of the drive cam 310, the second furrow 1052b positioned opposite of the first furrow 1052a in the first face 305 of the drive cam 310. The first detent 1404a of the driven gear 314, as shown in FIG. 14, may be inserted into a space in the first furrow 1052a adjacent to an end of the first ratcheting spring 320a, as indicated by dashed area 1502. The second detent 1404b may be similarly inserted in a space in the second furrow 1052b adjacent to an end of the second ratcheting spring 320b, as indicated by dashed area 1504.

When the park lock 300 is adjusted to the second position 303 of FIG. 3B, the driven gear 314 is rotated such that the first detent 1404a of the driven gear 314, positioned in the space indicated by dashed area 1502 in the first furrow 1052a, pushes against the end of the first ratcheting spring 320a and the second detent 1404b of the driven gear 314, positioned in the space indicated by dashed area 1504 in the second furrow 1052b, pushes against the end of the second ratcheting spring 320b, as indicated by arrows 1506. The ratcheting springs are compressed between the detents and an opposite end of their respective furrows. The stiffness of the ratcheting springs resists the compression, compelling return of the ratcheting springs to their pre-compressed configurations, e.g., as shown in FIG. 15. While the driven gear 314 is held in place by the actuator 324, the drive cam 310 is able to rotate in the direction indicated by the arrows 1506. Rotation of the drive cam 310 may be driven by expansion of the ratcheting springs to their pre-compressed configurations which includes ends of the ratcheting springs (distal to the detents) pushing against ends of the furrows, as indicated by arrows 1508. The pushing of the ratcheting springs against the furrow ends causes the drive cam 310 to rotate. When the ratcheting springs return to their pre-compressed configurations, the detents return to their respective positions indicated by dashed areas 1502 and 1504.

When the park lock 300 is adjusted from the second position 303 of FIG. 3B to the first position 301 of FIG. 3A, the driven gear 314 is rotated in an opposite direction, e.g., −α, as described above. The detents push against ends of the furrows, as indicated by arrows 1510, driving rotation of the drive cam 310 in the same direction.

In this way, a robustness and longevity of a park lock for a vehicle may be enhanced by configuring the park lock with a ball ramp-actuated dog clutch. In one example, the park lock is adapted with a first portion, configured with a first set of teeth, coupled to a rotating part of the vehicle and a second portion with a second set of teeth coupled to a stationary part of the vehicle. The first set of teeth is configured to engage with the second set of teeth, and the second portion includes a rotating set of components, a sliding set of components, and a ball-ramp actuating member. Interlocking of first and the second set of teeth, having an interference fit with one another, circumvents slippage when the park lock is engaged. By incorporating actuating components that rotate, a power output and demand of the actuator is reduced compared to a conventional park lock. For example, the rotational movement of the actuating components are converted to axial movement of the sliding set of components via a combination of ratcheting springs and the ball ramp actuating member. The park lock may be stabilized in each of an engaged and disengaged position by a combination of the ratcheting springs, a set of jounce springs, and a geometry of the ball ramp actuating member. As a result, the park lock may have a reduced footprint compared to conventional park locks, as well as reduced energy demands for actuation.

The disclosure also provides support for a park lock for a vehicle, comprising: a first portion coupled to a rotating part of a wheel assembly of the vehicle, the first portion having a first set of teeth, and a second portion anchored to a stationary part of the vehicle and having a second set of teeth configured to engage with the first set of teeth, wherein the second set of teeth of the second portion is coupled to a sliding set of components and the second portion further includes actuating devices to actuate a sliding of the second set of teeth, the actuating devices including a motion source, elastic elements, and one or more ramps. In a first example of the system, the first set of teeth and the second set of teeth extend toward one another and interlock when the first set of teeth and the second set of teeth are engaged. In a second example of the system, optionally including the first example, the sliding set of components includes a pawl fixedly coupled to a pawl-driven cam and wherein the pawl and the pawl-driven cam slide axially as a single unit. In a third example of the system, optionally including one or both of the first and second examples, a plurality of fasteners slide through openings in a frame fixedly coupled to the stationary part of the vehicle and positioned between the pawl and the pawl-driven cam and wherein each of the plurality of fasteners is surrounded by a spring extending between the frame and the pawl-driven cam. In a fourth example of the system, optionally including one or more or each of the first through third examples, the spring is compressed between the frame and the pawl-driven cam when the first set of teeth and the second set of teeth are interlocked. In a fifth example of the system, optionally including one or more or each of the first through fourth examples, the first portion includes a motor, a drive gear coupled to the motor, and a driven gear coupled to the drive gear and wherein when activated, the motor is configured to turn the drive gear to rotate the driven gear. In a sixth example of the system, optionally including one or more or each of the first through fifth examples, the driven gear includes a set of detents protruding into furrows in a surface of the second portion and wherein the furrows include ratcheting springs abutting the set of detents at one end of the ratcheting springs. In a seventh example of the system, optionally including one or more or each of the first through sixth examples, a plurality of balls is configured to roll along grooves in a surface of the sliding set of components and tracks in a surface of the first portion and wherein each of the grooves and the tracks include ramped sections forming the one or more ramps. In a eighth example of the system, optionally including one or more or each of the first through seventh examples, each of the surface of the sliding set of components and the surface of the first portion includes plateau regions arranged perpendicular to a central axis of rotation of the park lock at either end of the grooves and the tracks, respectively.

The disclosure also provides support for a park lock system, comprising: a rotating component, a stationary housing enclosing the rotating component, a first clutch member coupled to the rotating component and having a first set teeth, a second clutch member having a second set of teeth at a first axial side, a first ball-ramp cam on a second axial side, and a frame fixedly coupled to the stationary housing, and an actuating member with a second ball-ramp cam, the actuating member configured to compel sliding of the second clutch member along a central axis of rotation to engage with the first clutch member. In a first example of the system, the rotating component is coupled to a wheel assembly of a vehicle and the stationary housing is an axle housing and wherein when the first clutch member is engaged with the second clutch member, the rotating component is locked to the axle housing and when the rotating component is locked, the wheel assembly of the vehicle is maintained stationary. In a second example of the system, optionally including the first example, the actuating member is rotated through a first rotational angle and the rotation of the actuating member causes a ball to roll along both the first ball-ramp cam and the second ball-ramp cam in a first direction and wherein rolling of the ball along the first and the second ball-ramp cams in the first direction drives the sliding of the second clutch member to engage with the first clutch member. In a third example of the system, optionally including one or both of the first and second examples, the actuating member is rotated through a second rotational angle, opposite of the first rotational angle, to cause the ball to roll along the first ball-ramp cam and the second ball-ramp cam in a second direction, opposite of the first direction, to enable disengagement of the second clutch member from the first clutch member. In a fourth example of the system, optionally including one or more or each of the first through third examples, a gasket is arranged between the first ball-ramp cam and the second ball-ramp cam and wherein the gasket includes ball cages protruding outwards from the gasket, perpendicular to the central axis of rotation, each of the ball cages configured to surround a ball captured between the first ball-ramp cam and the second ball-ramp cam. In a fifth example of the system, optionally including one or more or each of the first through fourth examples, the actuating member includes a drive cam, a ball bearing, a driven gear, a drive gear, and a motor and wherein the ball bearing is in contact with the drive cam and fixedly coupled to the stationary housing. In a sixth example of the system, optionally including one or more or each of the first through fifth examples, the park lock system is stabilized when the first clutch member and the second clutch member are engaged by an alignment along the central axis of rotation of a region of increased thickness of the second clutch member with a region of increased thickness of the drive cam. In a seventh example of the system, optionally including one or more or each of the first through sixth examples, the park lock system is stabilized, when the first clutch member and the second clutch member are disengaged, by a stiffness of a plurality of springs extending between the frame of the second clutch member and a pawl-driven cam of the second clutch member and wherein the plurality of springs pushes the pawl-driven cam to press against the drive cam.

The disclosure also provides support for a method for a park lock, comprising: responsive to adjustment of a vehicle into a park mode, commanding activation of a motor to rotate an actuating member of a park lock in a first direction to engage a plurality of teeth of a first clutch member of the park lock with a plurality of teeth of a second clutch member of the park lock, the second clutch member coupled to an stationary component of the vehicle and the first clutch member coupled to a rotating component of the vehicle, and responsive to adjustment of the vehicle out of the park mode, commanding activation of the motor to rotate the actuating member of the park lock in a second direction, opposite of the first direction, to disengage the plurality of teeth of the second clutch member from the plurality of teeth of the first clutch member, and wherein rotation of the actuating member is translated to axial movement of the second clutch member by a plurality of balls configured to travel along ramps disposed in each of the second clutch member and the actuating member. In a first example of the method, the method further comprises: confirming a position of the second clutch member by a position sensor coupled to the second clutch member. In a second example of the method, optionally including the first example, the method further comprises: deactivating the motor after rotating the actuating member in the first direction through an angle when the vehicle is adjusted to the park mode and deactivating the motor after rotating the actuating member in the second direction through the angle when the vehicle is adjusted out of the park mode.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A park lock for a vehicle, comprising:
a first portion coupled to a rotating part of a wheel assembly of the vehicle, the first portion having a first set of teeth, and the rotating part of the wheel assembly being rotatable about a central axis of rotation; and
a second portion anchored to a stationary part of the vehicle and having a second set of teeth configured to engage with the first set of teeth;
wherein the second set of teeth of the second portion is coupled to a sliding set of components and the second portion further includes actuating devices to actuate a sliding of the second set of teeth, the actuating devices including a motion source, elastic elements, and one or more ramps, the elastic elements including one or more axially extending spring positioned to act in an axial direction parallel to the central axis of rotation so as to urge the first set of teeth and the second set of teeth axially toward or axially away from each other in the axial direction parallel to the central axis of rotation, and the elastic elements including one or more ratcheting spring positioned to act in a rotational direction about the central axis of rotation so as to urge one or more components of the actuating devices to rotate about the central axis of rotation.

2. The park lock of claim 1, wherein the first set of teeth and the second set of teeth extend toward one another and interlock when the first set of teeth and the second set of teeth are engaged.

3. The park lock of claim 1, wherein the sliding set of components includes a pawl fixedly coupled to a pawl-driven cam and wherein the pawl and the pawl-driven cam slide axially as a single unit.

4. The park lock of claim 3, wherein a plurality of fasteners slide through openings in a frame fixedly coupled to the stationary part of the vehicle and positioned between the pawl and the pawl-driven cam and wherein each of the plurality of fasteners is surrounded by each of the axially extending springs of the elastic elements extending between the frame and the pawl-driven cam.

5. The park lock of claim 4, wherein each of the axially extending springs is compressed between the frame and the pawl-driven cam when the first set of teeth and the second set of teeth are interlocked.

6. The park lock of claim 1, wherein the second portion includes a motor as the motion source, a drive gear coupled to the motor, and a driven gear coupled to the drive gear and wherein when activated, the motor is configured to turn the drive gear to rotate the driven gear.

7. The park lock of claim 6, wherein the driven gear includes a set of detents protruding into furrows in a surface of the second portion and wherein the furrows include the ratcheting springs of the elastic elements abutting the set of detents at one end of the ratcheting springs.

8. The park lock of claim 1, wherein a plurality of balls is configured to roll along grooves in a surface of the sliding set of components and tracks in a surface of the second portion and wherein each of the grooves and the tracks include ramped sections forming the one or more ramps.

9. The park lock of claim 8, wherein each of the surface of the sliding set of components and the surface of the second portion includes plateau regions arranged perpendicular to a central axis of rotation of the park lock at either end of the grooves and the tracks, respectively.

10. A park lock system, comprising:
a rotating component;
a stationary housing enclosing the rotating component;
a first clutch member coupled to the rotating component and having a first set teeth;
a second clutch member having a second set of teeth at a first axial side, a first ball-ramp cam on a second axial side, and a frame fixedly coupled to the stationary housing; and
an actuating member with a second ball-ramp cam, the actuating member configured to compel sliding of the second clutch member along a central axis of rotation to engage with the first clutch member,
wherein one or more axially extending spring is positioned to act in an axial direction parallel to the central axis of rotation so as to urge the first set of teeth and the second set of teeth axially toward or axially away from each other in the axial direction parallel to the central axis of rotation, and
wherein one or more ratcheting spring is positioned to act in a rotational direction about the central axis of rotation so as to urge the first ball-ramp cam and/or the second ball-ramp cam to rotate about the central axis of rotation.

11. The park lock system of claim 10, wherein the rotating component is coupled to a wheel assembly of a vehicle and the stationary housing is an axle housing and wherein when the first clutch member is engaged with the second clutch member, the rotating component is locked to the axle housing and when the rotating component is locked, the wheel assembly of the vehicle is maintained stationary.

12. The park lock system of claim 11, wherein the actuating member is rotated through a first rotational angle and the rotation of the actuating member causes a ball to roll along both the first ball-ramp cam and the second ball-ramp cam in a first direction and wherein rolling of the ball along the first and the second ball-ramp cams in the first direction drives the sliding of the second clutch member to engage with the first clutch member.

13. The park lock system of claim 12, wherein the actuating member is rotated through a second rotational angle, opposite of the first rotational angle, to cause the ball to roll along the first ball-ramp cam and the second ball-ramp cam in a second direction, opposite of the first direction, to enable disengagement of the second clutch member from the first clutch member.

14. The park lock system of claim 10, wherein a gasket is arranged between the first ball-ramp cam and the second ball-ramp cam and wherein the gasket includes ball cages protruding outwards from the gasket, perpendicular to the central axis of rotation, each of the ball cages configured to surround a ball captured between the first ball-ramp cam and the second ball-ramp cam.

15. The park lock system of claim 10, wherein the actuating member includes a drive cam which is the second ball-ramp cam, a ball bearing, a driven gear, a drive gear, and a motor and wherein the ball bearing is in contact with the drive cam and in part fixedly coupled to the stationary housing.

16. The park lock system of claim 15, wherein the park lock system is stabilized when the first clutch member and the second clutch member are engaged by an alignment along the central axis of rotation of a region of increased thickness of the second clutch member with a region of increased thickness of the drive cam.

17. The park lock system of claim 16, wherein the park lock system is stabilized, when the first clutch member and the second clutch member are disengaged, by a stiffness of the plurality of axially extending springs extending between the frame of the second clutch member and a pawl-driven cam of the second clutch member and wherein the plurality of axially extending springs pushes the pawl-driven cam to press against the drive cam.

18. A method for a park lock, comprising:
responsive to adjustment of a vehicle into a park mode,
commanding activation of a motor to rotate an actuating member of the park lock in a first direction to engage a plurality of teeth of a first clutch member of the park lock with a plurality of teeth of a second clutch member of the park lock, the second clutch member coupled to an stationary component of the vehicle and the first clutch member coupled to a rotating component of the vehicle, the rotating component of the vehicle being rotatable about a central axis of rotation; and
responsive to adjustment of the vehicle out of the park mode,
commanding activation of the motor to rotate the actuating member of the park lock in a second direction, opposite of the first direction, to disengage the plurality of teeth of the second clutch member from the plurality of teeth of the first clutch member; and wherein rotation of the actuating member is translated to axial movement of the second clutch member by a plurality of balls configured to travel along ramps disposed in each of the second clutch member and the actuating member, wherein one or more axially extending spring is positioned to act in an axial direction parallel to the central axis of rotation so as to urge the plurality of teeth of the first clutch member and the plurality of teeth of the second clutch member axially toward or axially away from each other in the axial direction parallel to the central axis of rotation, and wherein one or more ratcheting spring is positioned to act in a rotational direction about the central axis of rotation so as to urge the second clutch member and/or the actuating member to rotate about the central axis of rotation.

19. The method of claim 18, further comprising confirming a position of the second clutch member by a position sensor coupled to the second clutch member.

20. The method of claim 18, further comprising deactivating the motor after rotating the actuating member in the first direction through an angle when the vehicle is adjusted to the park mode and deactivating the motor after rotating the actuating member in the second direction through the angle when the vehicle is adjusted out of the park mode.

* * * * *